(12) United States Patent
Sines et al.

(10) Patent No.: US 10,934,101 B1
(45) Date of Patent: Mar. 2, 2021

(54) SYSTEMS, METHODS, AND APPARATUSES, FOR SINGULATING ITEMS IN A MATERIAL HANDLING ENVIRONMENT

(71) Applicant: INTELLIGRATED HEADQUARTERS, LLC, Mason, OH (US)

(72) Inventors: Vincent Sines, Owings Mills, MD (US); Rob Schlender, Owings Mills, MD (US); Allay Desai, Owings Mills, MD (US); Bill McConnell, Owings Mills, MD (US); Gabe Difurio, Owings Mills, MD (US); Matthew Good, Owings Mills, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/540,330

(22) Filed: Aug. 14, 2019

(51) Int. Cl.
| | |
|---|---|
| *B65G 47/31* | (2006.01) |
| *B65G 47/26* | (2006.01) |
| *B07C 1/04* | (2006.01) |
| *G06K 9/32* | (2006.01) |
| *G06N 3/04* | (2006.01) |

(52) U.S. Cl.
CPC ............... *B65G 47/31* (2013.01); *B07C 1/04* (2013.01); *B65G 47/268* (2013.01); *G06K 9/3233* (2013.01); *G06N 3/04* (2013.01); *B65G 2203/025* (2013.01); *B65G 2203/0233* (2013.01); *B65G 2203/041* (2013.01)

(58) Field of Classification Search
None
See application file for complete search history.

(56) References Cited

U.S. PATENT DOCUMENTS

| | | | |
|---|---|---|---|
| 6,401,936 B1 | 6/2002 | Isaacs et al. | |
| 6,910,569 B2 * | 6/2005 | Reznik | B65G 1/0478 198/444 |
| 9,783,371 B2 * | 10/2017 | Ooba | B65G 37/00 |
| 9,950,344 B2 | 4/2018 | Hartmann et al. | |

(Continued)

OTHER PUBLICATIONS

Communication pursuant to Rule 58 EPC, Invitation to remedy deficiencies in the application documents for European Patent Application No. 20190161.8 dated Aug. 27, 2020, 3 pages.

*Primary Examiner* — William R Harp
(74) *Attorney, Agent, or Firm* — Alston & Bird LLP

(57) ABSTRACT

A material handling system for singulation of items is described. The material handling system can include, a singulation conveyor with a mechanical actuator. The mechanical actuator can be configured to manipulate an item on the singulation conveyor. Further, the material handling system can comprise a sensing unit comprising an imaging device that can be configured to capture an image of a zone of a singulation conveyor. Further, the material handling system can have a control unit that can be configured to classify, based on a classification model and the image, the item into a category. The category can be indicative of an orientation of the item with respect to another item and a conveying surface of the singulation conveyor. Further, the control unit can be configured to, generate instructions to cause actuation of a mechanical actuator to perform a singulation action based on the classification associated with the item.

20 Claims, 15 Drawing Sheets

(56) References Cited

U.S. PATENT DOCUMENTS

| | | | |
|---|---|---|---|
| 10,486,915 B2* | 11/2019 | Kim | B65G 47/1492 |
| 2007/0246328 A1* | 10/2007 | Reznik | B65G 43/10 |
| | | | 198/444 |
| 2016/0354809 A1 | 12/2016 | Gruna et al. | |
| 2018/0215552 A1* | 8/2018 | Kim | B65G 37/00 |
| 2018/0339865 A1* | 11/2018 | Schroader | B65G 47/31 |
| 2020/0108414 A1* | 4/2020 | Sturm | B07C 5/3422 |

* cited by examiner

SYSTEMS, METHODS, AND APPARATUSES, FOR SINGULATING ITEMS IN A MATERIAL HANDLING ENVIRONMENT

TECHNOLOGICAL FIELD

Example embodiments described herein relate generally to systems, methods, and apparatuses for singulating items in a material handling environment, and, more particularly, to artificial intelligence (AI) based material handling system for singulating items on a conveyor.

BACKGROUND

Generally, in material handling environments like, but not limited to, distribution centers, warehouses, inventories, or shipping centers, a material handling system, can convey, handle, sort, and organize various type of items (e.g. cartons, cases, containers, shipment boxes, totes, packages, and/or the like) at high speeds. Depending on a configuration of a material handling system, the items may travel through the material handling environment in an unregulated manner (e.g., clustered, partially overlapping, substantially overlapping, and/or non-single file flow) at an initial time or may be repositioned, reoriented, and/or consolidated into a single stream of items, as the items move on conveyors. A singulator (or singulator conveyor) is an example of a conveyor that accepts an unregulated flow of items and discharges the items as a single file stream. Singulators are often wide bulk conveyors accepting inputs at various points (for example from one or more collector conveyors) and aligns the input items such that the items are discharged as a single file stream. Singulators may also include recirculation lines that can convey items that have not been successfully placed into the single file stream (i.e., not singulated) back to the start of the singulator. Singulation of items on the conveyor has associated challenges.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relates to a material handling system for singulation of items. The material handling system can comprise a singulation conveyor comprising a mechanical actuator. The mechanical actuator can be configured to manipulate an item of a plurality of items on the singulation conveyor. Further, the material handling system can comprise a sensing unit comprising an imaging device. The imaging device can be configured to capture an image of a zone of the singulation conveyor. The material handling system can further comprise a control unit communicatively coupled to the singulation conveyor and the sensing unit. According to said example embodiments, the control unit can be configured to: classify, based on a classification model and the image, the item of the plurality of items into a category. The category referred herein, can be indicative of an orientation of the item with respect to another item of the plurality of items and a conveying surface of the singulation conveyor. Further, the control unit of the material handling system can be configured to generate instructions to cause actuation of a mechanical actuator to perform a singulation action based on the classification associated with the item.

In accordance with said example embodiments, the material handling system can comprise an artificial intelligence (AI) subsystem. The AI subsystem can be communicatively coupled to the control unit. The AI subsystem can be configured to receive, from at least one of a color camera and a depth camera, image data corresponding to at least, the image captured by the at least one of the color camera and the depth camera. The AI subsystem can be further configured to, process, the image data to identify a foreground pixel and a background pixel from the image data. Further, the AI can be configured to, identify, based on the processing of the image data, a region of interest indicative of a bounding box corresponding to the item. The AI subsystem can further provide, co-ordinates of the region of interest and a label corresponding to the region of interest, to the control unit.

In some example embodiments, the AI subsystem can be further configured to, generate the classification model by using a pre-defined dataset of images and a Neural Network (NN). Further, the AI subsystem can be configured to, identify, based on the classification model, a label indicative of a predicted category of at least one of the item or the region of interest associated with the item.

According to some example embodiments, the control unit of the material handling system can be further configured to, cause updating of the classification model, by using a NN and based on the classification of the item and classify, a next item of the plurality of items on the singulation conveyor based on the image and using the updated classification model.

In some example embodiments, the control unit can be configured to, select the singulation action based on the classification of the item. Further, the control unit can be configured to generate instructions to cause actuation of the mechanical actuator to manipulate the item based on the identified singulation action.

According to some example embodiments, the singulation conveyor of the material handling system can comprise the mechanical actuators that can comprise a puck. In this regard, the puck can be configured to be pushed up or pulled down relative to a roller bed of the singulation conveyor to manipulate the item positioned on a conveying surface of the roller bed.

In some example embodiments, the AI subsystem of the material handling system can be configured to provide a list of regions of interests comprising at least one of: (a) a single region of interest indicative of a first region of interest comprising a single item, (b) a horizontal region of interest indicative of a second region of interest in which a first set of items are partially overlapping each other and meeting along a horizontal axis, (c) a vertical region of interest indicative of a third region of interest in which a second set of items are partially overlapping each other and meeting along a vertical axis, and (d) a stacked region of interest indicative of a fourth region of interest in which a third set of items are substantially overlapping with each other.

In some example embodiments, based on the classification of the item, the control unit can be configured to generate instructions to cause actuation of the mechanical actuator. In this regard, the mechanical actuator can be actuated to perform one or more of: (a) a de-shingling of the item from the plurality of items, (b) a horizontal splitting action to separate the item from the plurality of items, in a case wherein the item is partially overlapped on the plurality of items along a horizontal axis, (c) a vertical splitting action to separate the item from the plurality of items, in a case wherein the item is partially overlapped on the plurality of items along a vertical axis, (d) a quick stop action to stop movement of remaining items of the plurality of items, in a case wherein there is not enough space for the item to perform an action, and (e) a linear dispersion action to create a desired spacing between the item and the plurality of items.

Some example embodiments described herein relates to, a method for singulation of a plurality of items on a singulation conveyor in a material handling system. The method can comprise classifying, based on a classification model and an image of a zone of the singulation conveyor, an item of the plurality of items into a category. In this regard, the category is indicative of an orientation of the item with respect to another item of the plurality of items and a conveying surface of the singulation conveyor. Further, the method can comprise generating instructions to cause actuation of a mechanical actuator of the singulation conveyor to perform a singulation action on the item based on the classification of the item.

In some example embodiments, the method can further comprise receiving, from at least one of, a color camera and a depth camera, image data corresponding to at least the image. Further, the method can comprise processing, the image data to identify a foreground pixel and a background pixel from the image data. The method can further comprise determining, a region of interest indicative of a bounding box corresponding to the item. Upon determining the region of interest, the method can comprise providing, co-ordinates of the region of interest and a label corresponding to the region of interest to the control unit.

In some example embodiments, the method can comprise generating the classification model by using a pre-defined dataset of images and a Neural Network (NN). The method can further comprise identifying, a label indicative of a predicted category of at least one of the item or the region of interest associated with the item. In this regard, the label can be identified based on the classification model.

In some example embodiments, the method can further comprise updating the classification model, by using the NN and based on the classification of the item. Further, the method can comprise classifying, a next item of the plurality of items on the singulation conveyor based on the image and using the updated classification model.

In some example embodiments, the method can comprise selecting the singulation action based on the classification of the item. In some example embodiments, the method can comprise selecting the mechanical actuator from amongst a plurality of mechanical actuators on the singulation conveyor to manipulate the item based on the selected singulation action.

In some example embodiments, the method can comprise providing a list of regions of interests comprising at least one of: (i) a single region of interest indicative of a first region of interest comprising a single item, (ii) a horizontal region of interest indicative of a second region of interest in which a first set of items are partially overlapping each other and meeting along a horizontal axis, (iii) a vertical region of interest indicative of a third region of interest in which a second set of items are partially overlapping each other and meeting along a vertical axis, and (iv) a stacked region of interest indicative of a fourth region of interest in which a third set of items are substantially overlapping with each other.

In some example embodiments, the method can comprise generating, by the control unit, instructions to cause actuation of a puck of the mechanical actuator. The mechanical actuator can be configured to be pushed up or pulled down relative to a roller bed of the singulation conveyor to manipulate the item positioned on a conveying surface of the roller bed.

In some example embodiments, apparatus for singulation of a plurality of items in a material handling environment is described. The apparatus can comprise at least one processor and at least one non-transitory memory including program code. The at least one non-transitory memory and the program code can be configured to, with the at least one processor, cause the apparatus to at least: classify, using a classification model and an image of a zone of a singulation conveyor in the material handling environment, an item of the plurality of items, into a category indicative of an orientation of the item with respect to another item of the plurality of items and a conveying surface of the singulation conveyor. Further, the at least one non-transitory memory and the program code is can be configured to, with the at least one processor, further cause the apparatus to at least: select a singulation action from amongst a plurality of singulation actions to be performed by a mechanical actuator of the singulation conveyor to cause manipulation the item. In this regard, the singulation action can be selected based on the classification of the set of items.

In some example embodiments, the at least one non-transitory memory and the program code is further configured to, with the at least one processor, further cause the apparatus to at least: (i) process, image data received from at least one of: a color camera and a depth camera, to identify a foreground pixel and a background pixel from the image data, (ii) identify, based on processing of the image data, a region of interest indicative of a bounding box corresponding to the item, and (iii) determine, using a pre-defined Neural Network (NN), a label associated with the region of interest. The label can be indicative of a predicted category of the item.

In some example embodiments, the at least one non-transitory memory and the program code is further configured to, with the at least one processor, further cause the apparatus to at least: update, the classification model, by using NN and based on the classification of the item and classify, a next item of the plurality of items on the singulation conveyor based on the image and using the updated classification model.

In some example embodiments, the at least one non-transitory memory and the program code is further configured to, with the at least one processor, further cause the apparatus to at least: cause actuation of a puck of the mechanical actuator. In this regard, the puck can be configured to be pushed up or pulled down relative to a roller bed of the singulation conveyor to manipulate the item positioned on a conveying surface of the roller bed.

In some example embodiments, the at least one non-transitory memory and the program code is further configured to, with the at least one processor, further cause the apparatus to at least: select, the singulation action based on the classification of the item and select the mechanical actuator from amongst a plurality of mechanical actuators on the singulation conveyor, to manipulate the item based on the selected singulation action.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
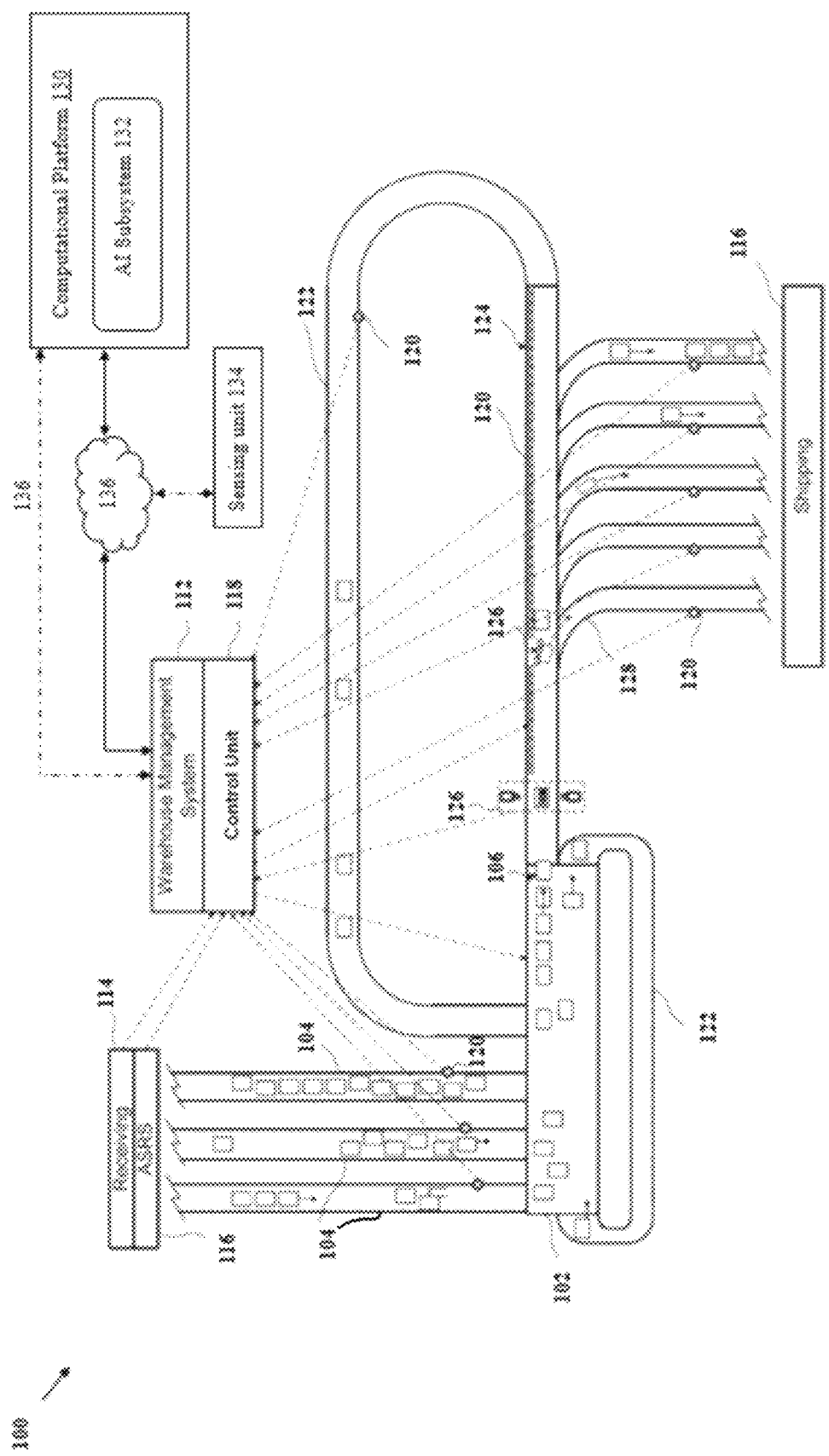
FIG. 1 illustrates a schematic view of a material handling system comprising a singulation conveyor, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

The various embodiments are described herein using the term "computing platform." The term "computing platform" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein. In some example embodiments, the computing platform may correspond to any of, an industrial computer, a cloud computing based platform, an external computer, a standalone computing device, and/or the like.

The term "computing device" can be used herein to refer to any or all of programmable logic controllers (PLCs), programmable automation controllers (PACs), industrial computers, desktop computers, personal data assistants (PDAs), laptop computers, tablet computers, smart books, palm-top computers, personal computers, and similar electronic devices equipped with at least a processor configured to perform the various operations described herein.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

FIG. 1 schematically depicts a material handling system 100 comprising a singulator conveyor 102, in accordance with some example embodiments described herein. Illustratively, the singulator conveyor 102 may receive an unregulated and/or overlapping flow of items from input conveyors 104 and output, a single stream of singulated mail, or multiple streams of singulated mail, comprising items 106 to a sortation system 108, such as a sortation system (e.g. including a linear sliding shoe sorter). In some example embodiments, the input conveyors 104, such as collector conveyors, may receive items from a presort system (not shown) and sort these items under overall control by a warehouse management system ("WMS") 112.

According to said example embodiments, the WMS 112 can track items that arrive in a receiving area 114 and/or that are buffered in an Automated Storage and Retrieval System ("ASRS") 116 of a material handling environment. Additionally, the WMS 112 can track items that arrive in a shipping area 116 for shipment out of the material handling system 100. In some example embodiments, the WMS 112 may also track information associated with operators (such as, but not limited to, current work levels, estimated completion times, and work characteristics) working in a material handling environment, to generate material handling system state inputs. For example, the WMS 112 may track information about the work being performed by the material handling system 100, such as current work assigned (e.g., orders to fill), estimated completion time of tasks or waves being processed, characteristics of the work being performed (e.g., type of cartons or items being moved and size of those items or cartons), etc. In this manner, by tracking such information, the WMS 112 may generate material handling system state inputs and provide the inputs to a conveyor controller i.e. a control unit 118 based on which the control unit can control various conveyor operations, such as conveyor speeds, singulation action, mechanical actuation etc. of various components (mechanical, electrical, etc.) in the material handling system 100.

While illustrated and described, the WMS 112 is merely on example of an external system that may provide inputs to the control unit 118, and other external systems, singularly or in combinations, may provide inputs to the control unit 118 for controlling operations of various equipments and components of the material handling system 100.

According to said example embodiments, items can be directed to input conveyors 104 for release onto the singulator conveyor 102, which in turn can singulate the items into the single file stream of items 106 and can output the singulated items onto a sortation system 120. According to said example embodiments, items on the singulator 102 which may not successfully singulated into the single file stream 106 may be re-circulated back to the start of the singulator 102, via the recirculation conveyor 122. In some example embodiments, an initial portion of the sortation system 120 may be an induct conveyor operating to identify each item in the single file stream of items 106 by a scanner 126. Accordingly, in said example embodiments, the items may then pass over the sortation system 120 (e.g. a linear shoe sorter) for selective diverting by shoes 126 to destinations, depicted as take-away conveyors 128. Those items that may not be diverted may be taken by a recirculation conveyor 122 back to the singulator conveyor 102.

According to said example embodiments, the material handling system can comprise a computational platform 130 that can comprise an artificial intelligence subsystem 132. Additionally, and/or alternatively, in some examples, the control unit 118 may also comprise the AI subsystem 132. According to said example embodiments, the AI subsystem 132 can be configured to perform image processing and use artificial intelligence and computer vision, for identifying a plurality of region of interests (ROI's) on the singulation conveyor 102. The ROIs may be used for classification of items on the singulation conveyor 120. The AI subsystem 132 may classify the items into various categories based on any of a shape, size, color, form factor, orientation, layout, etc. on the singulation conveyor 102. Based on the classification of items, the control unit 118 may cause to perform, selective singulation action, by one or more mechanical actuators of the material handling system 100. Details related to operations of the AI subsystem 134 are described later in reference to FIGS. 2-15.

Further, in accordance with said example embodiments, the material handling system 100 can also comprise a sensing system 134 comprising plurality of sensors 120, for example, one or more imaging devices, like, a color camera and/or a depth camera. In some example embodiments, the sensors 120 can correspond to, photo eyes, fullness sensors, volume sensors, speed sensors, RFID interrogators, and/or the like. According to said example embodiments, the sensing system 134 may additionally comprise a controller that may be configured to collect sensory data from the sensors 120 and provide the sensory data to the control unit 118.

In accordance with said example embodiments, the control unit 118, can be communicatively coupled, via a communication network 136 to the, a respective component of the material handling system 100 (for example, but not limited to, the singulator conveyor 102, the computational platform 130, the AI subsystem 132, the sensing system 134, and/or the sortation system 120, and/or the like) to perform various operations for example, but not limited to, singulation, sortation, and/or the like. In this regard, the one or more components referred herein, may comprise a communications circuitry that may be configured to receive and/or transmit data from/to a network and/or any other device, circuitry, or module in communication over the communication network 136.

The communications circuitry referred herein, may be any means such as a device or circuitry embodied in either hardware or a combination of hardware and software associated with the respective component of the material handling system 100. In some examples, the communications circuitry may comprise a network interface for enabling communications with a wired or wireless communication network. For example, the communications circuitry may comprise one or more network interface cards, antennae, buses, switches, routers, modems, and supporting hardware and/or software, or any other device suitable for enabling communications via the communication network 136. Additionally, or alternatively, the communications circuitry may comprise the circuitry for interacting with the antenna(s) to cause transmission of signals via the antenna(s) or to handle receipt of signals received via the antenna(s). These signals may be transmitted by any of the components of the material handling system 100 and/or the control unit 118 over the communication network 136, using a number of wireless personal area network (PAN) technologies, such as, but not limited to, BLUETOOTH® v 1.0 through v3.0, BLUETOOTHB Low Energy (BLE), infrared wireless (e.g., IrDA), ultra-wideband (UWB), induction wireless transmission, and/or the like or via a wired communication technology, such as a data field bus, cables etc.

In some example embodiments, the control unit 118 may receive inputs, such as from the computational platform 130, and/or the WMS 112, on any of: the input conveyors 104, the recirculation conveyors 122, and/or the take-away conveyors 128. In this regard, one or more of these components of the material handling system may comprise an input/output (I/O) circuitry that may be adapted to receive one or more inputs and provide one or more outputs. In some embodiments, the I/O circuitry may, in turn, be in communication with the control unit 118 to provide output to a user and, in some embodiments, to receive an indication of user input. The I/O circuitry may comprise a user interface and may comprise a display that may comprise a web user interface, a mobile application, a client device, and/or the like. In some embodiments, the I/O circuitry may also comprise a keypad, a joystick, a touch screen, touch areas, soft keys, a microphone, a speaker, or other input/output mechanisms. In some examples, the control unit 118 and/or a user interface circuitry comprising a processor associated with the I/O circuitry may be configured to control one or more functions of one or more user interface elements associated with the I/O circuitry through computer program instructions (e.g., software and/or firmware) stored on a memory accessible to the control unit 118.

According to some example embodiments, the control unit 118 may operate the singulator conveyor 102 and optionally the sortation system 120 at variable speeds, acceleration or de-acceleration, based at least in part on sensor data received from the sensing system 130, or other state information received from the input conveyors 104, the singulator conveyor 104, the sortation system 120, and/or take-away conveyors 128, information from the WMS 112, and/or data received from other sources. In this manner, inputs from the sensing system 130, speed or other state information received from the input conveyors 104, the singulation conveyor 104, the sortation system 120, and/or the take-away conveyors 128, information (e.g., material handling system state inputs) from the WMS 112 and/or data received from other sources may be used by the control unit 118 to determine downstream capacity and adjust the speed of conveyors, such as the singulation conveyor 104, the sortation system 120, and/or other conveyors.

According to said example embodiments, the computational platform 130 and/or the control unit 118 may cause execution of instructions to cause actuation or control or movement of one or more mechanical actuators (not shown) of the material handling system 100. In some examples, the mechanical actuators may be configured to cause de-shingling or singulation of one or more items from a stream of items, positioned on the singulation conveyor 102. In some example embodiments, the control unit 118 may comprise one or more Programmable logic controllers (PLCs) that can be configured to cause execution of a planned motion path or a robotic manipulation plan of the mechanical actuators. The planned motion path or the robotic manipulation plan may be planned by any of the control unit 118 and/or the computational platform 130.

Figure 2:
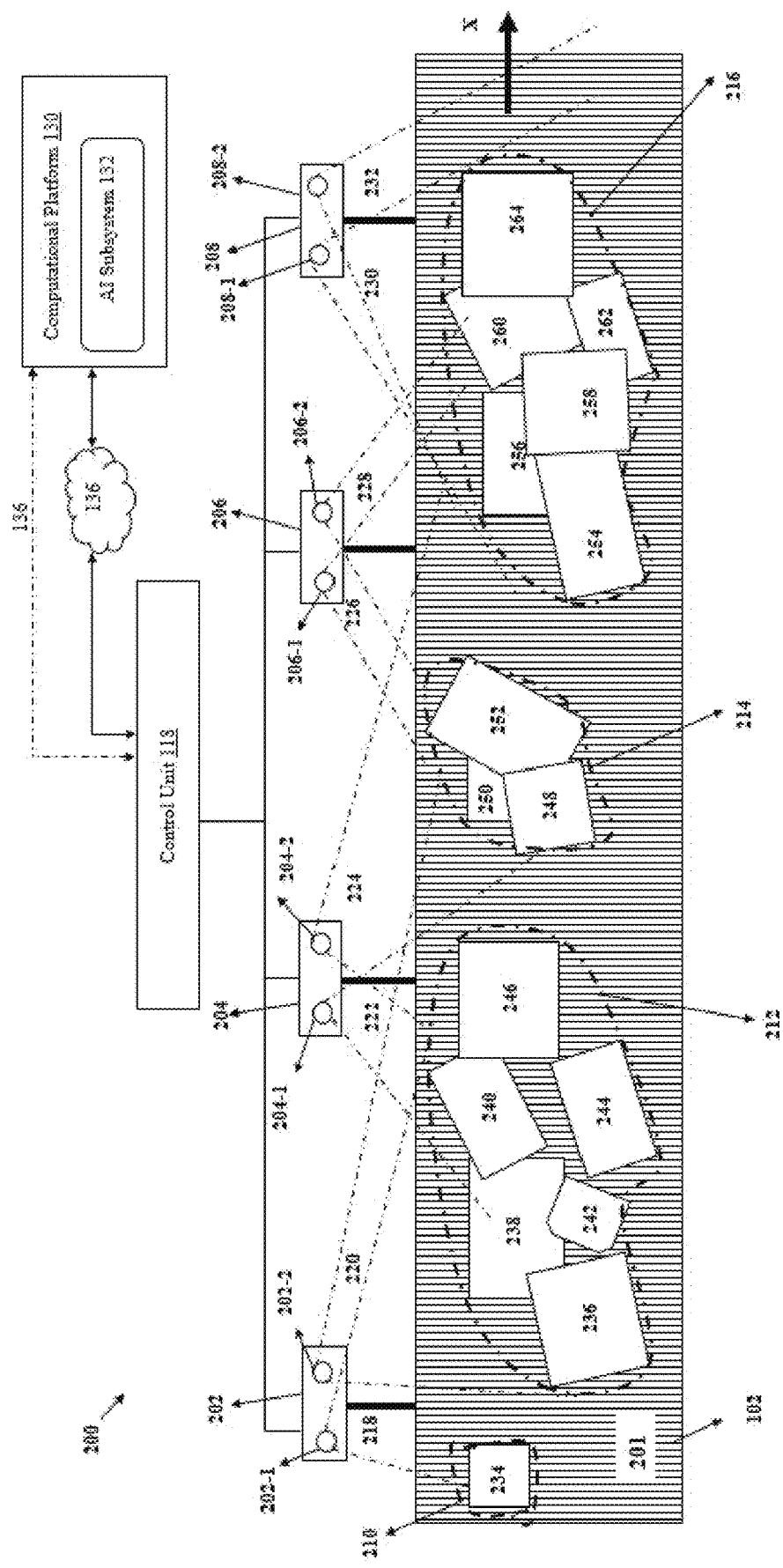
FIG. 2 schematically depicts the material handling system comprising an Artificial Intelligence (AI) subsystem and a control unit utilized for AI-based classification and singulation of items on the singulation conveyor, in accordance with some example embodiments described herein.

FIG. 2 schematically depicts an exemplary view 200 of the material handling system 100 comprising the AI subsystem 132 and the control unit 118 that can be utilized for AI based classification and singulation of items on the singulation conveyor 102, in accordance with some example embodiments described herein. Illustratively, a stream of items can be positioned on a conveying surface 201 the singulation conveyor 102. In accordance with said example embodiments, the singulation conveyor 102 can be configured to (a) convey the stream of items in a direction X of conveyance and (b) singulate the items by separating the items of the stream of items and creating desired or programmed gaps amongst the items. In some examples, the direction X of conveyance of the stream of items may correspond to an upstream direction of conveying items in a material handling environment. Alternatively, in some examples, the direction X of conveyance may correspond to a downstream direction of conveying items in the material handling environment.

As illustrated, the material handling system 100 can comprise a plurality of sensors such as, sensors 202, 204, 206, and 208 (similar to the sensors 120) that may be positioned near the singulation conveyor 102. The sensors 202, 204, 206, and 208 may be communicatively coupled to the sensing unit 134 via the communication network 136. In accordance with some example embodiments, one or more of the sensors 202, 204, 206, and 208 can correspond to imaging devices comprising color cameras (202-1, 204-1, 206-1, and 208-1) and/or depth cameras (202-2, 204-2, 206-2, and 208-2), respectively. In this aspect, the color cameras (202-1, 204-1, 206-1, and 208-1) of the sensors (202, 204, 206, and 208) can be configured to capture colored images of one or more sections of the singulation conveyor 102. Further, according to said example embodiments, the depth cameras (202-2, 204-2, 206-2, and 208-2) can be configured to capture three-dimensional (3D) images (i.e. comprising image data in three dimensions) of the one or more sections of the singulation conveyor 102.

Although, each imaging device, illustrated in FIG. 2 comprises two imaging devices (i.e. the color camera and the depth camera respectively), however, without limiting scope of the present disclosure, in some alternative example embodiments, a first set of imaging devices may comprise the depth cameras and the color cameras while a second set of imaging devices may comprise color cameras only. In some examples, a third set of imaging devices may comprise depth cameras only. The depth cameras (202-2, 204-2, 206-2, and 208-2) referred herein, may be configured to provide image data comprising depth information, for example, a plurality of 3D points over various surfaces of items and/or points on different surfaces that may be captured in a scene. Here, a 3D point represents three-dimensional coordinates of a point that may lie on a surface of an item or any other surface captured in the scene.

In accordance with said example embodiments, each camera of the sensors (202, 204, 206, and 208) may be configured to capture one or more images of at least, a section of the singulation conveyor 102 that may be within in field of views (218, 219, 220, 222, 224, 226, 228, 230, and 232) of the color cameras (202-1, 204-2, 206-1, and 208-1) and/or the depth cameras (202-2, 204-2, 206-2, and 208-2) respectively. In some examples, the images captured by the sensors (202, 204, 206, and 208) may also include some images that may be captured by cameras of two imaging devices placed adjacently next to each other that can comprise a same portion of the section of the singulation conveyor 102.

According to some example embodiments, the AI subsystem 132 may access the image data captured by the color cameras (202-1, 204-1, 206-1, and 208-1) and the depth cameras (202-2, 204-2, 206-2, and 208-2) to determine different regions of interests (ROI's) on the singulation conveyor 102. Said differently, the AI subsystem 132 may be configured to provide (e.g. to the control unit 118), data comprising: information about the ROI's 210, 212, 214, and 218. In accordance with said example embodiments, the ROI's determined by the AI subsystem 132 may correspond to a bounding box that can include one item or a set of items within it. In this regard, each ROI (210, 212, 214, and 218) can corresponds to the bounding box or a virtual periphery that can be constructed around the item or the set of items, within the respective ROI. Said differently, an ROI represents the virtual periphery that can sufficiently bound or enclose boundaries of the item or the set of items. For example, the ROI 210 can comprise one item 234, the ROI 212 can comprise 6 items viz. 236, 238, 240, 242, 246, and 248, the ROI 214 can comprise 3 items viz. item 248, 250, and 252, and the ROI 216 can comprise 6 items viz. item 254, 256, 258, 260, 262, and 264.

According to said example embodiments, to provide information about the ROI's 210, 212, 214, and 218, in some examples, the AI subsystem 132 may process the image data received from the color cameras (202-1, 204-1, 206-1, and 208-1) and identify foreground pixels and background pixels in the images. For example, in some embodiments, foreground pixels or background pixels may be identified based detection of a continuation or a pattern in pixel values observed for a set of pixels in the image data. Further, in accordance with said example embodiments, to identify or distinguish items that may be of a same color as of a surface of the singulation conveyor 102 or a background object in the scene, the AI subsystem 132 may use image data received from the depth cameras (202-2, 204-2, 206-2, and 208-2). In this regard, 3D point information in the image data received from the depth cameras (202-2, 204-2, 206-2, and 208-2) can be utilized by the AI subsystem 132 to identify geometric features in the image data that can be used to distinguish an item having a same color as of the background. The AI subsystem 132 can identify a subset of 3D points that may correspond to geometric features on surfaces of the items. For example, the AI subsystem 132, may identify such 3D points from the image data (received from the depth cameras), which corresponds to geometric features having distinguishing characteristics on the surface of the item, such as corners, edges (as described above), interest points, blobs etc.

In accordance with said example embodiments, the AI subsystem 132 and/or the depth cameras (202-2, 204-2, 206-2, and 208-2) may utilize various image processing techniques such as, but not limited to time of flight estimation, triangulation or phase shift estimation, etc. for identifying 3D points from the captured images and interest point detection techniques such as, corner detection, edge detection, feature detection (like, but not limited to, search based edge detection techniques or zero crossing-based edge detection techniques) for identifying geometric feature points on the items. Geometric feature points referred herein, corresponds to selected 3D points in the image data from the depth cameras (202-2, 204-2, 206-2, and 208-2), representing features like edges, corners, special markings, and/or the like, on the items.

In some example embodiments, the AI subsystem 132 may compare the identified feature points with some reference points to construct the ROI's 210, 212, 214, and 218. The reference points referred herein, represents 3D points in another image data of images that may have been captured by the sensors (202, 204, 206, and 208) when no item is present on the singulation conveyor 102. The AI subsystem 132 and/or the sensors (202, 204, 206, and 208) may be initially calibrated based on these reference points.

Additionally, and/or alternatively, in some example embodiments, the AI subsystem 132 may use the identified feature points and perform 'image registration' to construct the ROI's. 210, 212, 214, and 218. In this regard, the AI subsystem 132 may use techniques, for example, but not limited to, 'scale shift invariant transformation', 'Hough transform', or any other image registration techniques to construct the ROIs 210, 212, 214, and 218. To this extent, the image registration may comprise computing a 'transformation function' based on processing of the plurality of images captured by the sensors. The transformation function derived from aforementioned techniques can provide a mapping of 3D points identified from one image captured by a first sensor to respective 3D points identified in other image frame captured by a second sensor of the sensors (202, 204, 206, and 208). This transformational relationship between coordinate values of same 3D point in different image frames can be used to construct a ROI representative of a complete 3D scan of the item or the set of items. Accordingly, the AI subsystem 132 can provide the ROI's 210, 212, 214, and 218 on the singulation conveyor 102 which encloses an item or a set of items.

In accordance with said example embodiments, the AI subsystem 132 can be configured to provide (e.g. to the control unit 118), data comprising: a label associated with each of the ROI's 210, 212, 214, and 218, respectively. The label associated with each ROI may be indicative of a classification or a predicted category (e.g. a single item, horizontally overlapped items, vertically overlapped items, stacked items, and/or the like) of one or more items within the respective ROI. Further, details of the identification of the ROI's and labels associated with the ROI's are described later in reference to FIGS. 13-15.

According to said example embodiments, the AI subsystem 132 can be configured to generate a classification model that is used by the AI subsystem 132 for providing the label information associated with the ROI's. In some example embodiments, the AI subsystem 132 can generate the classification model by using a pre-defined data set of images (e.g. training data set) and using a Neural Network (NN), for example a Convolutional Neural Network. In some examples, other known architectures or models of neural networks can be used by the AI subsystem 132 to generate the classification model. It may be understood that in accordance with said example embodiments, upon operation and over a period of time, images can be added or subtracted from the pre-defined dataset of images. In some examples, the classification model generated by the AI subsystem 132 may be used by the control unit 118 for classifying items or set of items on the singulation conveyor 102, into one or more categories. The categories into which the items may be classified, may be indicative of an orientation of the items relative to other items (e.g., but not limited to, horizontal orientation, vertical orientation, stacked over each other, and/or the like) and/or a conveying surface of the singulation conveyor 102. According to said example embodiments, referring to the ROI 210, a label associated with the ROI 210, by the AI subsystem 132, may indicate a category as a single item. Further, referring to the ROI 212, a label associated with the ROI 212, by the AI subsystem 132, may indicate a category to as a horizontally stacked (i.e. the items 236, 238, 242, 240, 244, and 246 are positioned or grouped with one item in front of another item). Said differently, each of the items 236, 238, 242, 240, 244, and 246 partially overlaps to each other and meet along a horizontal axis. Similarly, referring to the ROI 216, a label associated with the ROI 216, by the AI subsystem 132, may indicate a category to as vertically stacked (i.e. the items 254, 258, 256, 260, 262, and 264 are positioned or grouped with one item next to another item). Said differently, each of the items 254, 258, 256, 260, 262, and 264 partially overlaps to each other and meet along a vertical axis. Referring to the ROI 214, a label associated with the ROI 214, by the AI subsystem 132, may indicate a category as stacked indicating that items 248, 250, and 252 are substantially overlapping each other. In accordance with said example embodiments, vertically stacked items or category vertical referred herein, can represent a direction of the vertical axis that can be parallel to the surface of the singulation conveyor 102 and perpendicular to flow direction of items on the singulation conveyor 102.

Further, in accordance with some example embodiments, the classification model generated by the AI subsystem 132, may be updated periodically or continuously, by the control unit 118, based on real-time classification of the items on the singulation conveyor 102. Further details of classification of items based on the classification model are described in reference to FIGS. 13-15.

Figure 3:
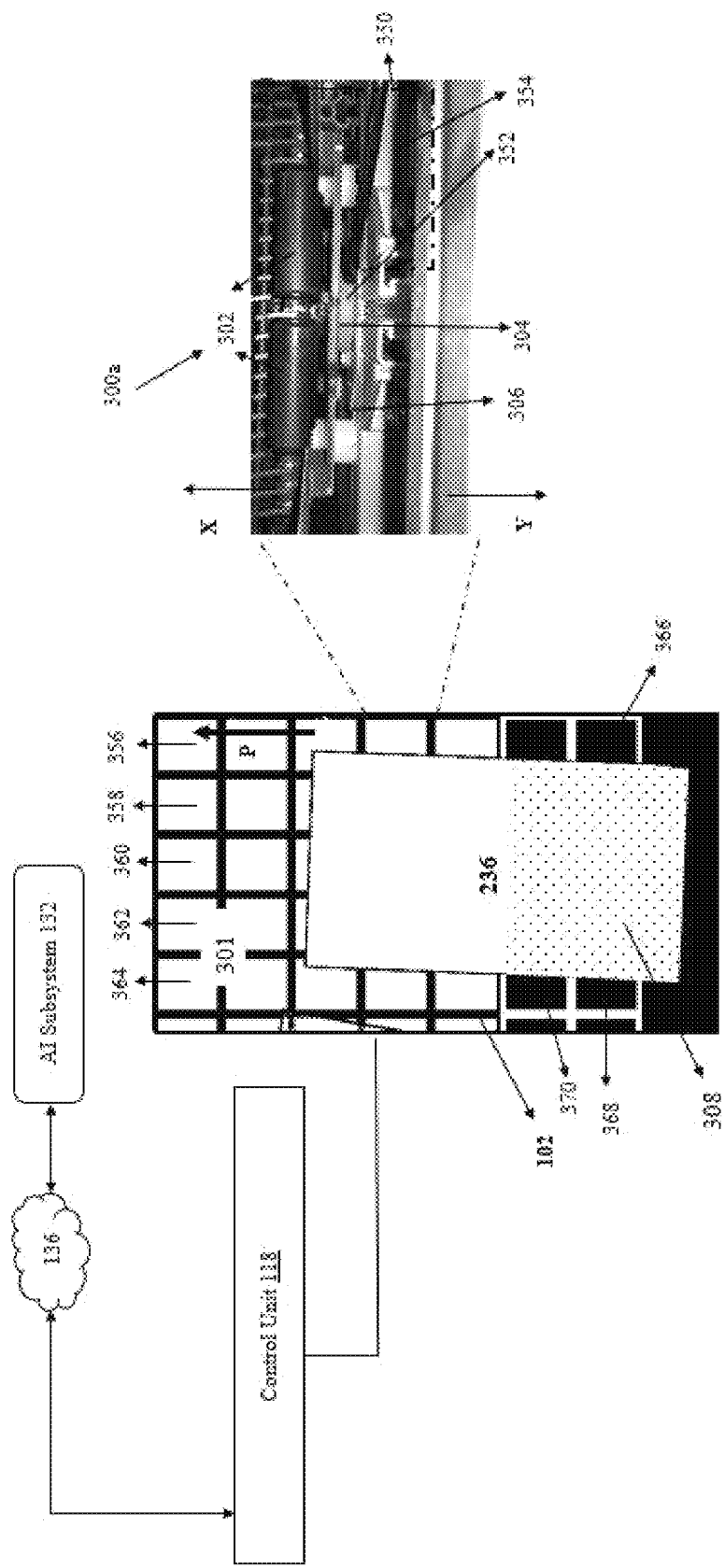
FIG. 3 illustrates a section of the singulation conveyor depicting a first type of mechanical actuator, in accordance with some example embodiments described herein.

FIG. 3 illustrates a first type of mechanical actuator on the singulation conveyor 102, in accordance with some example embodiments described herein. In accordance with some example embodiments, the first type of mechanical actuators that can be used for singulation of items can correspond to an arrangement comprising a plurality of pucks that can be positioned beneath a plurality of rollers on a conveyor bed of the singulation conveyor 102. For singulation, the plurality of pucks can be actuated, by the control unit 118, to perform manipulation of items on the singulation conveyor 102. As shown in FIG. 3, the singulation conveyor 102 can comprise a plurality of pucks (356-370) that can be positioned beneath rollers throughout a conveyor bed 301 defined by a conveyor belt and the rollers. The plurality of pucks (356-370) can be configured for manipulating items on the singulation conveyor 102 based on mechanical action. In some example embodiments, the conveyor bed 301 illustrated herein, can be defined by a plurality of rollers 302 and a conveyor belt (not shown). The conveyor belt can be mounted around the plurality of rollers 302 and can be configured to be driven by a drive motor, in an upstream or downstream direction of conveyance, for conveying the items. For singulation, the control unit 118 may selectively actuate one or more of the pucks (356, 358, 360, 362, 364, 366, 368, 370, and/or the like) beneath the plurality of rollers 302 based on classification of the item or the set of items on the singulation conveyor 102.

Illustratively, the perspective view 300a, depicts an assembly of a mechanical actuator 350 below the rollers 302 on the conveyor bed 301. The mechanical actuator 350 comprises, a puck 352 mechanically coupled to a pneumatic arm 354. In accordance with said example embodiments, the plurality of pucks 356, 358, 360, 362, 364, 366, 368, 370, and/or the like, that can be positioned beneath the plurality of rollers 302 in a similar arrangement as depicted in perspective view 300a for a single puck 352. In some examples, the puck 352 may correspond to a bladder (e.g. a plastic bladder) that may be inflated or deflated by pumping air via the pneumatic arm, to cause raising up or lowering down of the puck relative to a surface. As illustrated, the pneumatic arm 354 is mechanically coupled to the puck 352 at one end and to a pneumatic cylinder (or a similar actuator) at a second end. In accordance with said example embodiments, the puck 352 can be raised up relative to the activation plate 304 in the direction X and/or can be lowered down relative to the activation plate 304 in the direction Y, to control rotation of the rollers 302. In this regard, in response to actuation by the control unit 118, the puck 352 can be raised up in the direction X, so as to, abut with a portion of the activation plate 304. A further raising up of the puck 352, causes the activation plate 304 to move up along with the puck 352 abutted on the portion of the activation plate 304, in the direction X, until a further movement of the activation plate 304 is stopped by plate stops 306 positioned at two ends beneath the rollers 302. As the activation plate 304 is moved up, the activation plate 304 contacts with a portion of the rollers 302 that may be rotating at a defined speed by the conveyor belt under normal operation of the singulation conveyor 102. In normal operation, i.e. when the activation plate 304 is not in contact with the rollers 302, the rollers 302 can rotate freely. In this regard, in some examples, the rollers 302 are a part of the conveyor belt, so as the drive motor drives the conveyor belt, the rollers 302 move along with the conveyor belt over the activation plate 304, which in a down position does not contact's the rollers 302. Also, the conveyor belt driven by the drive motor, moves in an upstream or a downstream direction, over the rollers 302 which drives the rotation of the rollers 304. However, upon actuation of the puck 352, as the activation plate 304 contacts the rollers 302, a speed at which the rollers 302 are operating is increased. The speed is increased because a diameter of the rollers 302, is smaller than the conveyor belt drive pullies, so the rollers 302 spin faster than the conveyor belt 301 when in contact with the activation plate 304. As a result, an item or a set of items, in this area, that experiences the said singulation action due to raising of the puck 352 tend to travel at twice a speed of the conveyor belt.

Accordingly, lowering down the puck 352 lowers down the activation plate 304 to lose contact with the rollers 302, thereby reducing rotational speed of the rollers 302. Accordingly, rotational speed of the rollers 302 or a speed at which the item or the set of items, moves on the conveyor bed 301, can be controlled by raising up the puck 352 to cause contacting of the activation plate 304 with the portion of the roller or lowering down the puck 352 to cause the rollers 302 to rotate freely. Thus, based on controlling the rotational speed of the rollers 302, a conveyance speed of the item or set of items on the singulation conveyor 102 can be manipulated, thereby causing singulation of the items.

In accordance with said example embodiments, the control unit 118 can classify the item 236, using the classification model generated by the AI subsystem 132, to be of a horizontal orientation with respect to other items on the singulation conveyor 102 and/or the conveyor surface of the singulation conveyor 102. In other words, the AI subsystem 132 can label a region of interest (ROI) in which the item 236 is positioned as horizontal ROI. Further, the control unit 118 can classify each item within the ROI of a category horizontal orientation relative to other items within the ROI and a conveyance surface of the conveyor bed 301. In accordance with said example embodiments, to manipulate the item 236 on the singulation conveyor 102, some of the pucks (352-370) can be actuated by the control unit 118 to cause an intended singulation action. For instance, in some example embodiments, the control unit 118 may actuate some pucks beneath a portion 308 (trailing end) of the item 236 so as to cause singulation action on the portion 308 of the item 236. In this aspect, in some examples, as the item 236 passes on the conveyor bed 301, the portion 308 of the item 236 moves in a direction P at a speed higher or almost twice as compared to a speed at which a remaining portion of the item 236 moves on the conveyor bed 301. This singulation type can be used to separate the item 236 (i.e. having horizontal orientation) from other items on the singulation conveyor 102.

According to said example embodiments, the plurality of pucks (352-370) beneath the conveyor bed 301 may be initially, in a raised-up state. However, as the item 236 passes, some pucks beneath the remaining portion of the item 236 may be lowered, while the pucks beneath the portion 308 may remain in the raised-up state to cause separation of the item 236 from the other items on the singulation conveyor 301. Thus, a similar mechanism of raising up or lowering down of some of the plurality of pucks (352-370) can be used by the control unit 118 for singulation of the items. Thus, the plurality of pucks (352-370) can be selectively actuated by the control unit 118 to perform different types of singulation actions depending on a classification associated with the items or set of items, details of which are described hereinafter, in reference to FIGS. 4-15.

In accordance with various example embodiments described herein, the material handling system 100 may comprise any type of mechanical actuators (such as, robotic manipulators, pucks, pop up blockers, deshingler rollers, and/or the like) that may be used for manipulating the items on the singulation conveyor 102 for singulation. For instance, in some example embodiments, the mechanical actuators on the singulation conveyor 102 may correspond to a deshingler arrangement that can be used for singulation of items. In the deshingler type of arrangement, the conveyor bed 301 can comprise a plurality of rollers or belts that can be controlled individually by the control unit 118 to operate at different configurations. Said differently, in such an arrangement, each belt of the plurality of belts or each roller of the plurality of rollers can be actuated and operated at different speeds or acceleration or de-acceleration depending on a singulation action associated with the items. In some example embodiments, other mechanisms of singulation on the singulation conveyor 102 can also be used for singulation of items based on the classification by the AI subsystem 132.

Figure 4:
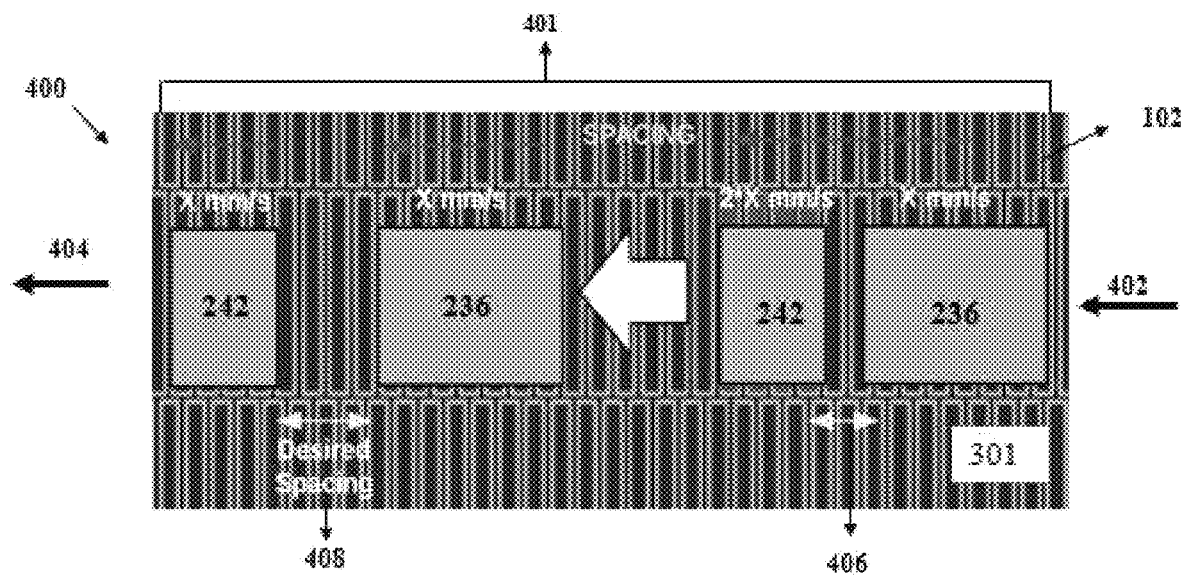
FIG. 4 illustrates an example of the first type of singulation action that can be performed on items on the singulation conveyor, by a second type of mechanical actuators of the singulation conveyor, based on classification of items by the AI subsystem, in accordance with some example embodiments described herein.

FIG. 4 illustrates, an example of a first type 400 of singulation action that can be performed on the items on the singulation conveyor 102, by a second type of mechanical actuators of the singulation conveyor 102. The second type of mechanical actuators illustrated in FIG. 4 corresponds to a deshingler arrangement which comprises a plurality of rollers 401 defining the conveyor bed 302. In the deshingler arrangement, shown in FIG. 4, each roller of the plurality of rollers 401 can be controlled individually by the control unit 118 and operated at different speeds, acceleration, and de-acceleration from the remaining rollers to cause singulation of items on the singulation conveyor 102.

Illustratively, items 236 and 242 can inflow on the conveyor bed 301 from a direction 402 and upon singulation, outflow in a direction 404, on the singulation conveyor 102. The first type 400 of the singulation action, illustrated in FIG. 4, is to create a desired spacing 408 between two items i.e. the item 236 and the item 242, that are initially spaced apart at an initial spacing 406 (different than the desired spacing 408). In some example embodiments, the control unit 118 may actuate a set of rollers to create desired spacing 408 between the items 236 and 242. Said differently, the desired spacing 408 between the items 236 and 242 can be created by manipulating rotational speed of the set of rollers, from amongst the plurality of rollers 401, that are positioned beneath the items 236 and 242 respectively. In this regard, in some example embodiments, the set of rollers 404 beneath the item 236 can be actuated by the control unit 118, to rotate at a first speed (x rotations/sec) which can be half or lower than a second speed (e.g. 2× rotations/sec) at which a second set of rollers 405 beneath the item 242 can rotate.

Accordance to said example embodiments, the singulation action of creating the desired spacing 408 between the items 242 and 236 can be selected by the control unit 118 based on a classification associated with the items 242 and 236. The classification of items 242 and 236 on the singulation conveyor 102 can be provided by the AI subsystem 132 based on similar techniques as described in reference to FIG. 2.

Figure 5:
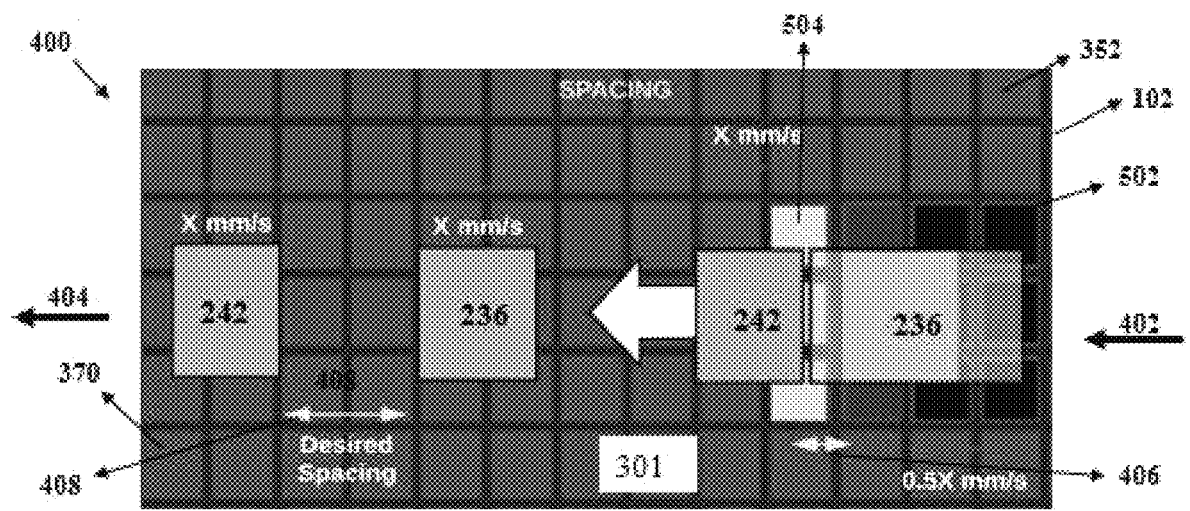
FIG. 5 illustrates an example embodiment of the first type of singulation action that can be performed on the items on the singulation conveyor, by the first type of mechanical actuators of the singulation conveyor, based on classification of items by the AI subsystem, in accordance with some example embodiments described herein.

FIG. 5, illustrates the first type 400 of singulation action that can be performed on the items on the singulation conveyor 102, by the first type of mechanical actuators of the singulation conveyor 102, in accordance with some example embodiments described herein. The first type of mechanical actuators illustrated in FIG. 5 corresponds to an arrangement comprising the plurality of pucks (352-370) (similar to arrangement as described earlier in FIG. 3). In some example embodiments, for singulation of items 236 and 242, selective raising or lowering of sets of pucks beneath the conveyor bed 301 can be performed, by the control unit 118, to create the desired spacing 408. For instance, in some example embodiments, the control unit 118 can selective actuate a first set of pucks 502 (i.e. pucks positioned beneath rollers that are under a trailing end of the item 236) and a second set of pucks 504 (i.e. pucks positioned beneath rollers that are under a leading end of the item 236 and trailing end of the item 242) to cause separation of the items 236 and 242. By actuating the first set of pucks 502 and the second set of pucks 504, the item 242 which is leading the item 236 moves on the singulation conveyor 102 at a first speed that is different than a second speed at which the item 236 moves on the singulation conveyor 102. According to said examples, the second set of pucks 504 beneath the item 242 can be raised up to cause movement of the item 242 at the first speed (2×) that can be two times or more than that of the second speed (x) at which the item 236 moves on the conveyor bed 301 due to lowering down of the first set of pucks 502, until the desired spacing 408 is created between the items 242 and 236. Accordingly, the desired spacing 408 can be created between the items 242 and 236.

Figure 6:
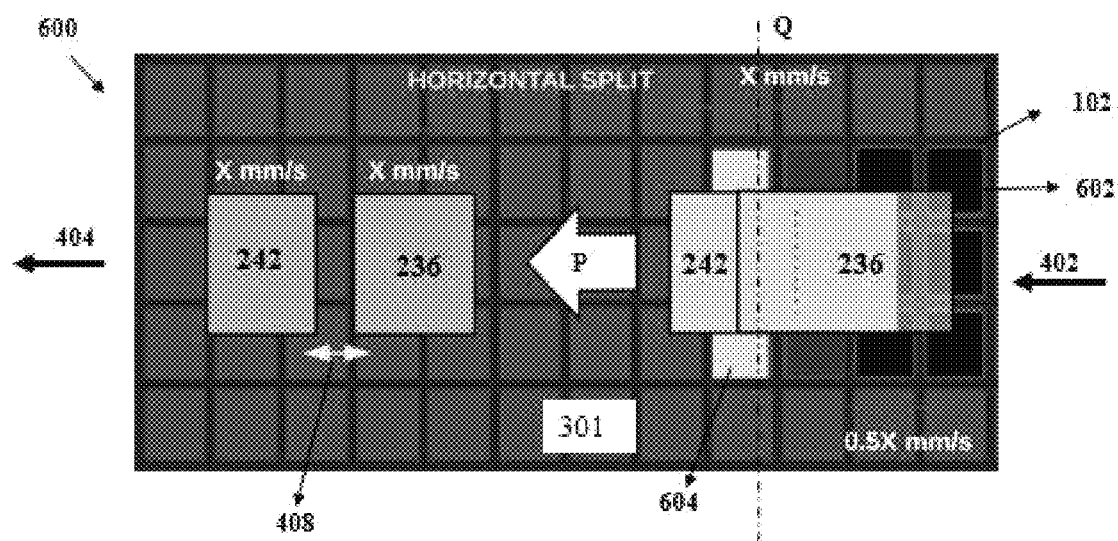
FIG. 6 illustrates an example of a second type of singulation action that can be performed on the singulation conveyor by the first type of mechanical actuators, based on classification of items by the AI subsystem, in accordance with some example embodiments described herein.

FIG. 6 illustrates, an example of a second type 600 of singulation action that can be performed on the singulation conveyor 102 by the first type of mechanical actuators (i.e. puck-based arrangement as described in FIGS. 3 and 5). The second type 600 of the singulation action corresponds to horizontally splitting (i.e. separation) of the items 242 and 236 that can be partially overlapping with each other on the singulation conveyor 102 along a horizontal axis Q. According to said example embodiments, the AI subsystem 132 labels ROI including the items 236 and 242 to correspond to horizontal orientation partially based on identifying that the horizontal axis Q about which the items 236 and 242 overlaps is almost perpendicular to a direction of conveyance P of the items on the singulation conveyor 102.

Illustratively, the items 236 and 242 can inflow on the conveyor bed 301 from a direction 402 and upon singulation, outflow in a direction 404, on the singulation conveyor 102. As the items 236 and 242 are inflowed on the singulation conveyor 102, some portion of the item 242 overlaps with the item 236 along the horizontal axis Q relative to surface of the singulation conveyor 102. In accordance with said example embodiments, as described in FIGS. 3 and 4, selective raising or lowering of: a first set of pucks 602 (positioned beneath rollers under a trailing end of the item 236 on the conveyor bed 301) and a second set of pucks 604 (positioned beneath a leading end of the item 236 and a trailing end of the item 242) can be performed, by the control unit 118, to horizontally separate the item 242 from the item 236, thereby so creating a desired spacing 408 between the items 242 and 236. Said differently, the control unit 118 can selective actuate: to lower the first set of pucks 602 and to raise the second set of pucks 604, thereby creating a speed differential between speeds at which the items 242 and 236 move on the conveyor bed 301. In this regard, the speed differential can be created to cause the item 242 to move at a first speed and the item 236 to move to a second speed which is different than the first speed.

In one example, the control unit 118 may actuate the first set of pucks 602 to cause movement of the item 236 at the second speed which is half of the first speed at which the item 242 moves on the singulation conveyor 102 due to actuation of the second set of pucks 604. In another example, the control unit 118 may actuate the first set of pucks 602 to cause movement of the item 236 at the second speed which is one fourth of the first speed at which the item 242 moves on the singulation conveyor 102 due to actuation of the second set of pucks 604. Similar combinations of the first speed and the second speed at which the items 242 and 236 moves can be attempted by the control unit 118 to cause the second type of singulation action, i.e. horizontal separation of the items 236 and 242.

In accordance with said example embodiments, the second type 500 of the singulation action of horizontally separating the items 242 and 236, can be selected by the control unit 118 based on a classification associated with the items 242 and 236. The classification associated with the items 242 and 236 can be determined based on a label associate with the ROI enclosing the items 242 and 236 provided by the AI subsystem 132. In this case, the label may be indicative of a horizontal orientation of the items 242 and 236 with each other and/or to a surface of the conveyor bed 301.

Figure 7:
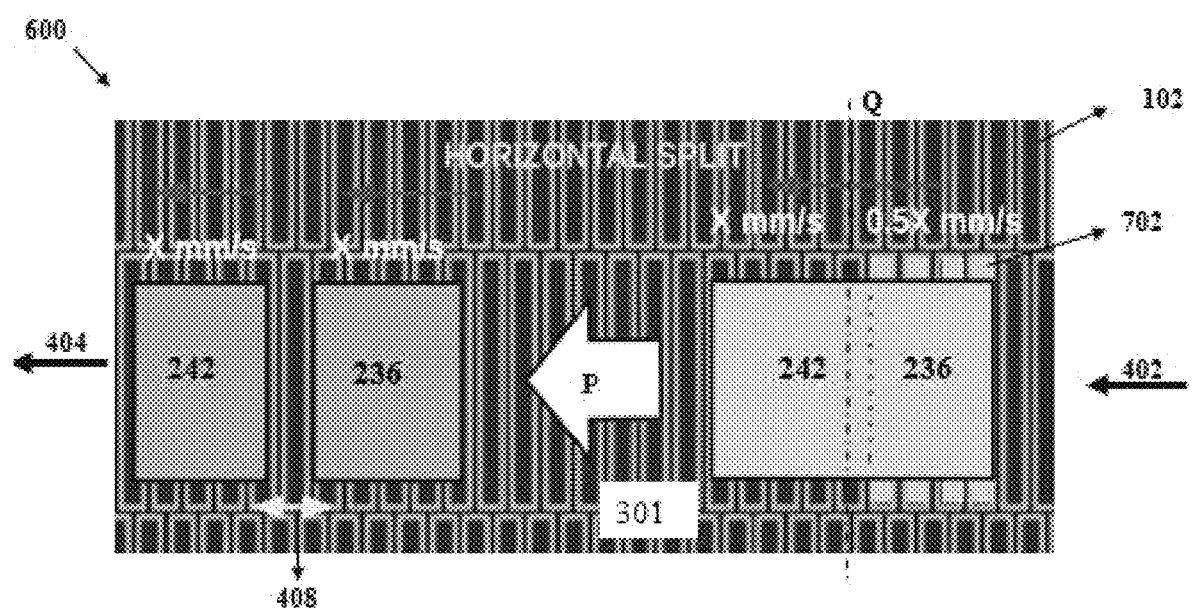
FIG. 7 illustrates an example of the second type of the singulation action that can be performed on the singulation conveyor by the second type of mechanical actuators, based on classification of items by the AI subsystem, in accordance with some example embodiments described herein.

FIG. 7 illustrates, an example of the second type 600 of the singulation action that can be performed on the singulation conveyor 102 by the second type of mechanical actuators (i.e. deshingler based arrangement, as described in FIG. 4). Similar to FIG. 6, the items 236 and 242 partially overlaps with each other along the horizontal axis Q. However, FIG. 7 depicts the singulation action of the second type (i.e. horizontal separation of items) performed based on second type of mechanical actuators i.e. a deshingler arrangement having the plurality of rollers 401 defining the conveyor bed 301, as described in FIG. 4.

For singulating the items 242 and 236, a set of rollers 702 beneath an overlapping portion of the items 236 and 242 can be actuated by the control unit 118 to create a speed difference between speeds at which the items 236 and 242 move on the conveyor bed 301. In this aspect, the speed difference between a first speed at which a leading end of the item 242 moves on the singulation conveyor 102 and a second speed at which a trailing end of the item 242 and a leading end of the item 236 moves on the singulation conveyor 102, causes separation of the items 236 and 242. In this regard, the set of rollers 702 can be actuated by the control unit 118, to rotate at a speed that can be lower than a rotational speed of remaining rollers of the plurality of rollers 401 on the conveyor bed 301 to cause movement of the item 242 at a faster speed compared to the movement of the item 236, thereby resulting in separation of the items 236 and 242.

Figure 8:
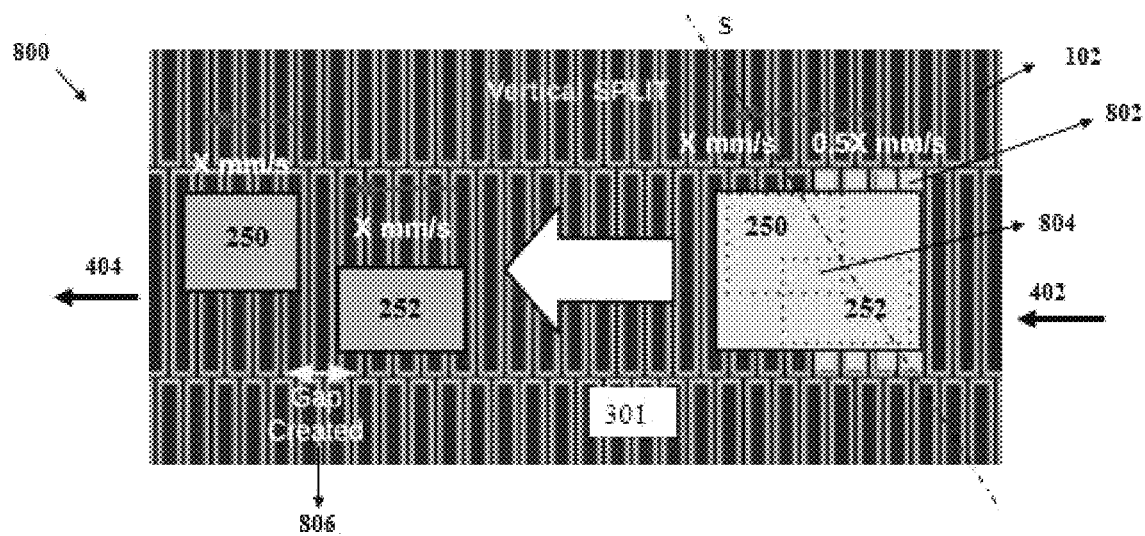
FIG. 8 illustrates an example embodiment of a third type of singulation action that can be performed on the singulation conveyor by the second type of mechanical actuators, based on classification of items by the AI subsystem, in accordance with some example embodiments described herein.
Figure 9:
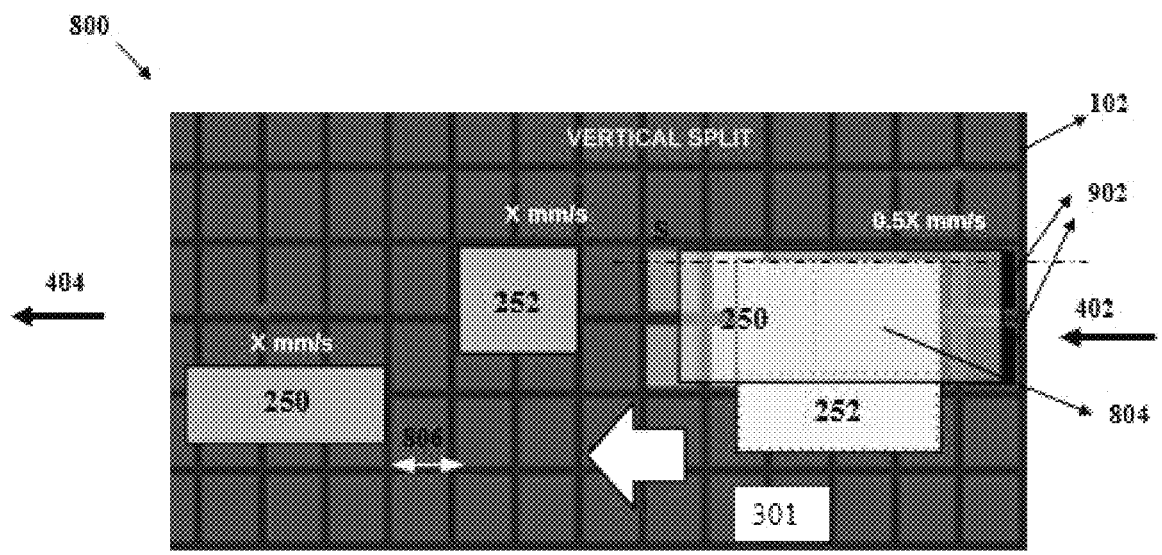
FIG. 9 illustrates another example embodiment of the third type of singulation action that can be performed on the singulation conveyor by the first type of mechanical actuators, based on classification of items by the AI subsystem, in accordance with some example embodiments described herein.

FIG. 8 illustrates a third type 800 of singulation action that can be performed on the singulation conveyor 102 by the second type of mechanical actuators (deshingler based arrangement as described in FIGS. 4 and 6). FIG. 9 illustrates, the third type 800 of singulation action that can be performed on the singulation conveyor 102 by the first type of mechanical actuators (i.e. puck-based arrangement as described in FIGS. 3 and 5). In accordance with said example embodiments, the third type 600 of the singulation action can correspond to vertically separating the items 252 and 250. The third type 800 of the singulation action, can be selected by the control unit 118 based on a classification associated with the items 252 and 250 that indicates a vertical orientation of the items 252 and 250 with respect to each other and/or to a surface of the conveyor bed 301.

Illustratively, the items 250 and 252 can inflow on the conveyor bed 301 from a direction 402 as a single mail in which the item 250 can partially overlap over the item 252, along a vertical axis S relative to a surface of the conveyor bed 301. Upon singulation on the singulation conveyor 102, the items 252 and 250 can be separated and outflow in a direction 404. According to said example embodiments, the third type 800 of the singulation action causes separation of items 252 and 250, as shown in FIGS. 8 and 9. According to said example embodiments, unlike horizontal overlapping where the items are positioned side by side against each other, a vertical overlapping of the items 252 and 250 corresponds to a partial overlapping of the items positioned next to each other on the singulation conveyor 102. The third type 800 of singulation action, i.e. the vertical split action on vertically overlapped items can be performed, when the AI subsystem 132 reports a ROI associated with the items 252 and 250 to be associated with a vertical classification. In the vertical classification, the items 252 and 250 may overlap partially about a vertical axis S that can be parallel to a direction of conveyance of the items 252 and 250.

According to said example embodiments, as shown in FIG. 8, to perform third type of singulation action by the second type of mechanical actuators, the control unit 118 may cause to actuate a set of rollers 802 below a portion 804 of overlapping of the items 250 and 252. Actuation of the rollers 802 can cause slowing down movement of the item 252 compared to a movement of the item 250 on the conveyor bed 301. Said differently, actuation of the rollers 804 causes the item 250 to move at a first speed which is lower than a second speed at which the item 250 moves on the singulation conveyor 102, thereby causing vertical separation.

Further, according to said example embodiments, for the third type 800 of singulation action based on the first type of the mechanical actuators, as shown in FIG. 9, the control unit 118 may selectively actuate (i.e. raise up or lowers down) a set of pucks 902 beneath trailing ends of the items 252 and 250 (i.e. the overlapping portion 804 of the items 250 and 252) to vertically separate the item 252 from the item 250 and create a desired gap 806 between the items 252 and 250. Actuating the set of pucks 902 creates a speed differential between a first speed at which a leading item, i.e. the item 252 and a trailing item, i.e. the item 250 moves on the singulation conveyor 102. The speed differential can be created based on the singulation action by the set of pucks 902 so as to cause, the item 252 to move at a first speed and the item 250 to move to a second speed which is different than the first speed. In one example, the control unit 118 may actuate the set of pucks 902 to cause movement of the item 250 at the second speed which is half of the first speed at which the item 252 moves on the singulation conveyor 102. Similar combinations of the first speed and the second speed at which the items 252 and 250 can move on the singulation conveyor 102, can be attempted by the control unit 118 to cause the second type of singulation action, i.e. vertical separation of the items 250 and 252.

Figure 10:
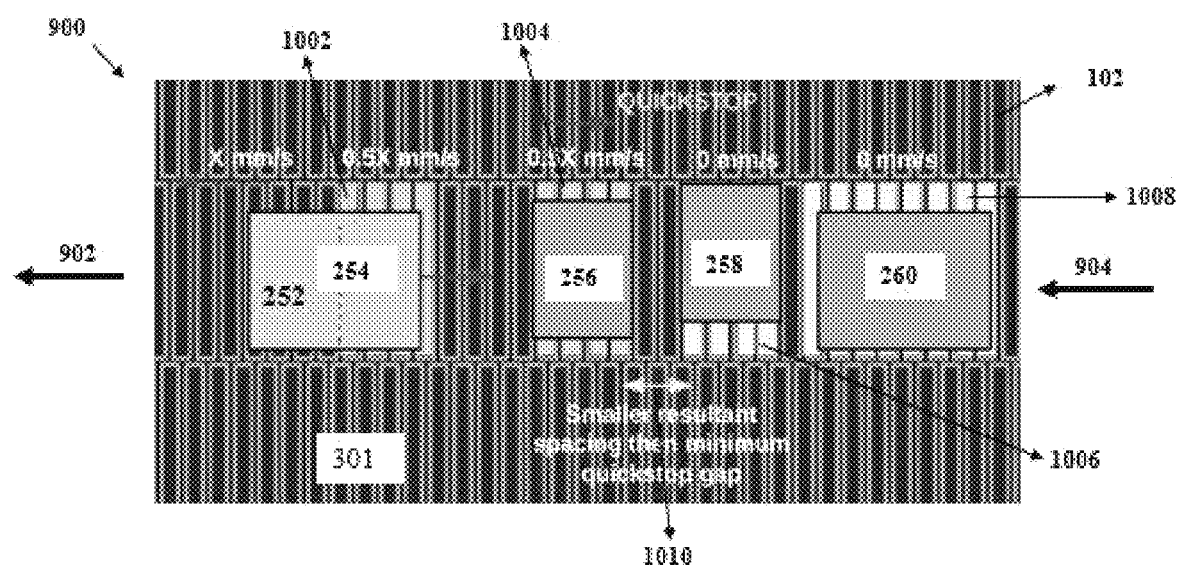
FIG. 10 illustrates an example embodiment of a fourth type of the singulation action that can be performed on items on the singulation conveyor, based on classification of items by the AI subsystem, in accordance with some example embodiments described herein.

FIG. 10 illustrates, a fourth type 900 of the singulation action that can be performed on items on the singulation conveyor 102, based on classification of items by the AI subsystem 132, in accordance with some example embodiments described herein. Typically, while singulating the items on singulation conveyors, a change due to singulation action on one item on the singulation conveyor 102 gets propagated to other items downstream on the singulation conveyors. The fourth type 900 of the singulation action corresponds to a quick-stop singulation action, where a singulation action can be performed on an item based on a state of singulation of other items on the singulation conveyor 102. For instance, in one example embodiment, the fourth type 900 of the singulation action may comprise stopping, by the control unit 118, a movement of items 252 and 254 moving in the upstream direction 902 on the singulation conveyor 102, when the AI subsystem 132 identifies from ROIs (corresponding to items on the singulation conveyor 102) that there may not be enough space for items (256, 258, and 260) inflowing from the downstream direction 904 to perform an action.

Illustratively, items (viz. 252, 254, 256, 258, and 260) can inflow on the conveyor bed 301 from a downstream direction 904 and upon singulation, outflow in an upstream direction 902, on the singulation conveyor 102. As illustrated, a portion of the items 252 and 254 may overlap to each other along a horizontal axis relative to the singulation conveyor 102 (similar to horizontal overlapping, as discussed in FIGS. 6 and 7). According to said example embodiments, based on ROIs of the items 252 and 254 determined by the AI subsystem 132, the control unit 118 may cause to perform a horizontal split singulation action on the items 252 and 254, by actuating a set of rollers 1002 beneath the items 252 and 254, in a similar fashion as discussed in FIG. 7. In this regard, as the set of rollers 1002 beneath trailing end of the item 252 and the item 254 are actuated, the trailing end of the item 254 begins to slow down. Said differently, leading end of the item 252 moves at a first speed that is faster than a second speed at which the item 254 moves on the conveyor bed 301. However, as movement of the item 254 slows down on the conveyor bed 301, the control unit 118 may determine a requirement to perform singulation actions on the items 256, 258, and 260 (i.e. to slow down movement of the item 256 and stop movement of the items 258 and 260) to prevent jamming and avoiding collision of the item 254 and the items 256, 258, and 260. In this regard, in accordance with said example embodiments, based on the ROIs of the items (256, 258, and 260) and associated singulation actions on the items 252 and 254, the control unit 118, may cause stopping of the movement of the items 258 and 260. To stop the movement of the items 258 and 260, the control unit 118 may cause to actuate a third set of rollers 1006 and a fourth set of rollers 1008 beneath the items 258 and 260. Also, the control unit 118, may cause to actuate a second set of rollers 1004 to cause slowing the movement of the item 256 such that, a minimum quick stop gap 1010 can be created between the items 256 and 258.

Figure 11:
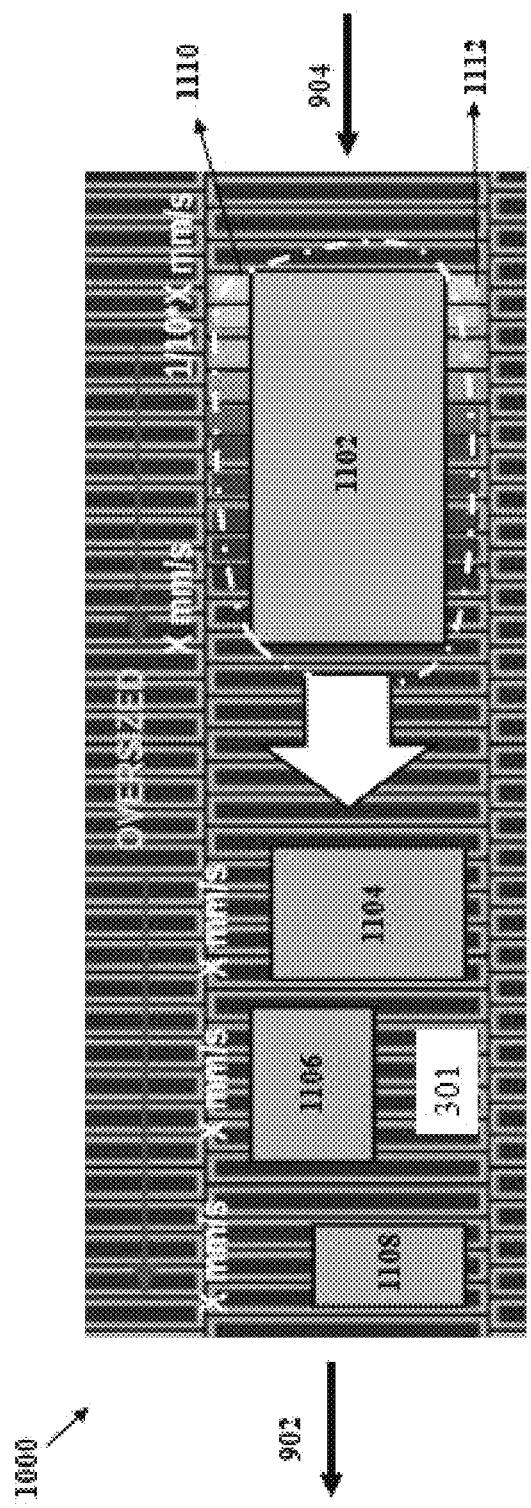
FIG. 11 illustrates an example embodiment of a fifth type of the singulation action that can be performed on items on the singulation conveyor, based on classification of items by the AI subsystem, in accordance with some example embodiments described herein.

FIG. 11 illustrates, a fifth type 1000 of the singulation action that can be performed on items on the singulation conveyor 102 based on classification of items by the AI subsystem 132, in accordance with some example embodiments described herein. In some example embodiments, the AI subsystem 132 may provide an ROI 1110 and classification associated with the ROI 1110 to be a 'single item'. However, it may so happen, that upon processing co-ordinates of the ROI 1110, the control unit 118 may identify that an estimated size of the single item within the ROI 1110 is much greater than a maximum size that can be possible for an item or a set of items within the ROI 1110. Said differently, in such cases, the control unit 118 may identify that the ROI 1110 and classification reported by the AI subsystem 132 may not be relevant, as there may be more than one items within the ROI 1110 reported by the AI subsystem 132. In such example embodiments, using co-ordinates of the ROI 1110 provided by the AI subsystem 132, the control unit 118 can label the item 1102 to be an 'oversized item' on the singulation conveyor 102. In other words, the oversized item 1102 referred herein, can correspond to an item having dimensions identified by the control unit 118 to be greater than usual dimensions that can be possible for usual items in a material handling environment.

Accordingly, in said example embodiments, the control unit 118 may determine that the classification reported by the AI subsystem 132 (i.e. single item) may not be applicable for performing an intended singulation action (i.e. no singulation action). Rather, in such cases, the control unit 118 can cause a set of rollers 1112 beneath the ROI 1110 to perform a singulation action (i.e. a horizontal split singulation action or a vertical split singulation action, and/or the like).

In accordance with said example embodiments, the control unit 118 can perform singulation actions based on considering the ROI 1110 to comprise more than one item, rather than a single item. For example, in some embodiments, the control unit 118 may perform a horizontal split or a vertical split singulation action (as described in FIGS. 6-9). Thus, for the oversized item 1102, the control unit 118 may cause to perform singulation action on the oversized item 1102, that can be different from a usual singulation action (i.e. no singulation) that may be applicable according to a classification of the ROI (single item) determined by the AI subsystem 132. In some alternate example embodiments, the control unit 118 may cause to actuate each roller of a set of rollers 1102 beneath the oversized item 1102 to rotate at a speed different from remaining rollers in the set of rollers 1102, thereby creating a gradient speed differential to cause separation of multiple items that can be present within the ROI 1110.

Figure 12:
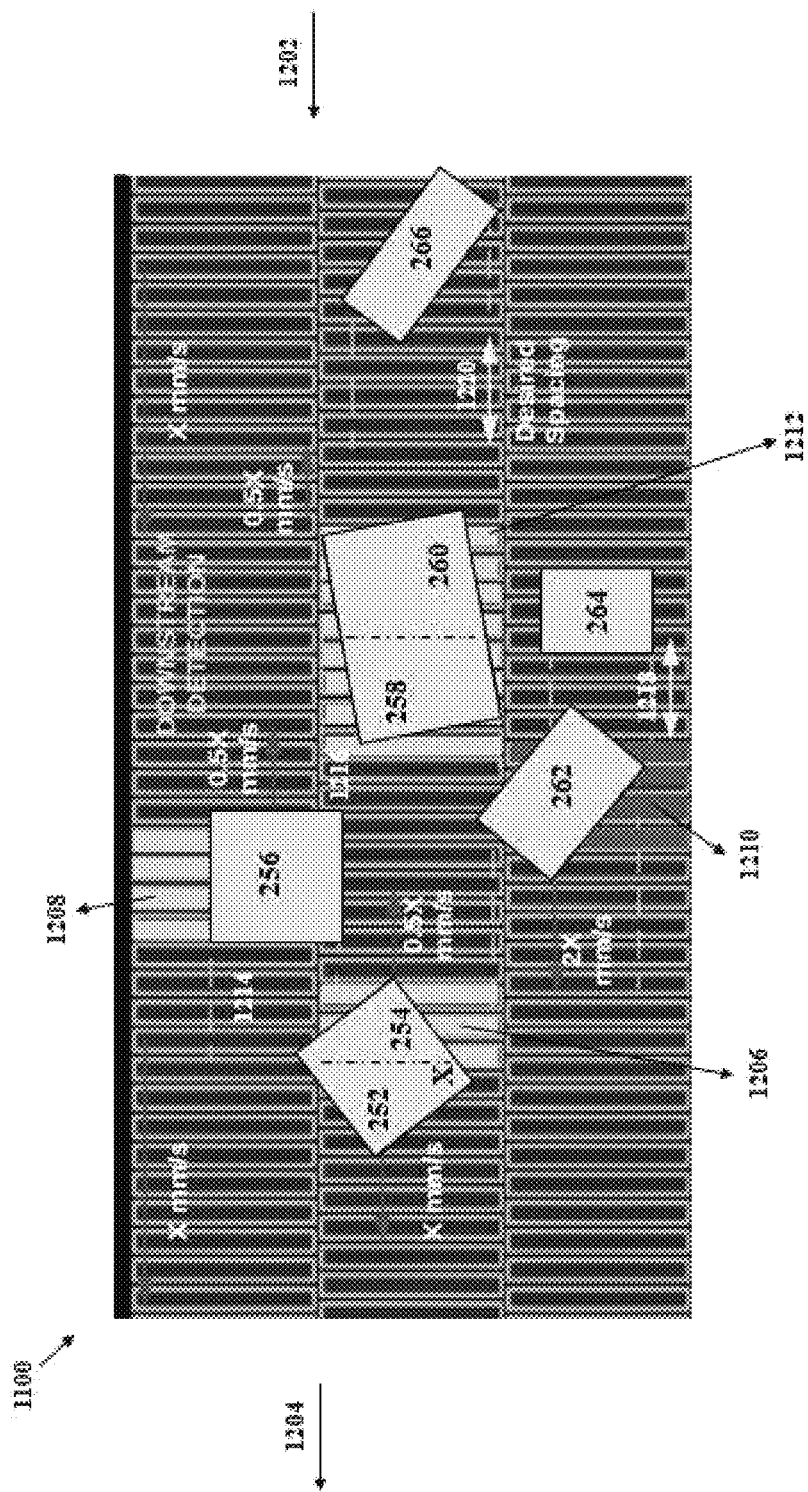
FIG. 12 illustrates an example embodiment of a sixth type of the singulation action that can be performed on items on the singulation conveyor, based on classification of items by the AI subsystem, in accordance with some example embodiments described herein.

FIG. 12 illustrates a sixth type 1100 of the singulation action that can be performed on items on the singulation conveyor 102 based on classification of items by the AI subsystem 132, in accordance with some example embodiments described herein. The sixth type 1100 of the singulation action may correspond to a singulation by multiple actuators (i.e. sets of rollers or sets of pucks) on the singulation conveyor 102 based on considering a singulation state of other items. In some examples, the control unit 118 can generate instructions to cause actuation of the mechanical actuator 152 to perform a singulation action on an item based on proximity of the item to nearby items. As shown, items 252-266 may inflow on the singulation conveyor 102 from an upstream direction 1202 and upon singulation may outflow in a downstream direction 1204. In accordance with some example embodiments, singulation actions performed on each item of the items 252-266 may be based on a singulation state of remaining items of the items 252-266, downstream to the respective item.

In some example embodiments, the AI subsystem 132 can be configured to provide to the control unit 118, an ROI comprising the items 252 and 254 to be associated with a classification indicative of a horizontal layout. As no other item is detected downstream to the items 252 and 254, by the AI subsystem 132 and/or the sensing unit 134, the control unit 118 may actuate a first set of rollers 1206 to cause a singulation action of the second type 600 (i.e. horizontal split) on the items 252 and 254 (i.e. separate items 252 and 254 that are partially overlapping along a horizontal axis X relative to the conveyor bed 301). The singulation action of the second type 600 can be performed in a similar fashion, as described in reference to FIGS. 6 and 7. Said differently, the set of rollers 1206 beneath trailing end of the item 254 can be actuated to cause movement of the item 254 at a first speed which is slower than a second speed of at which the item 252 moves in the downstream direction 1204, thereby causing separation of the items 252 and 254.

According to said example embodiments, the control unit 118 may further identify an effect of the singulation action (i.e. horizontal split on the items 252 and 254) on the item 256 which is upstream to the items 252 and 254. For instance, as the set of rollers 1206 slows down a speed of the trailing end of the item 254, the control unit 118 may identify the effect of slowing down of the item 254 on the movement of the item 256. In this regard, the control unit 118 can cause to actuate a second set of rollers 1208 beneath the item 256 to slow down a movement of the item 256 and maintain a spacing 1214 between the items 254 and 256. By performing this singulation action, the control unit 118 also avoids collision of the item 254 with the item 256. Furthermore, the control unit 118 may identify that there is no item present downstream to the item 1210. In this regard, the control unit 118 may actuate a third set of rollers 1210 to increase a speed of movement of the item 262.

Further, according to said example embodiments, although the AI subsystem 132 may provide a classification associated with the items 258 and 260 to be a horizontal layout that may be associated with the second type 600 of singulation action (horizontal split) on the items 258 and 260. However, the control unit 118 may identify that horizontal split singulation action, may not be desirable due to effect of ongoing singulation action on the items 252, 254, and 256 on the item 258 and 258. Said differently, as the control unit 118 causes a movement of the item 254 to slow down and further slowdown movement of the item 256, the control unit 118 may not perform the horizontal split singulation action on the items 258 and 260 to: avoid collision of the item 258 with the item 256 and maintain a spacing 1216 between the item 256 and 258. Similarly, the control unit 118 may not actuate a set of rollers beneath the item 264 and maintain a current speed of movement of the item 264 to maintain a spacing 1218 between the items 262 and 264. Furthermore, the control unit 118, upon identifying a singulation action on the item 260, may cause rollers beneath the item 266 to maintain a current speed of movement of the item 266, so as to avoid reduction in spacing 1220 between the items 260 and 266. Thus, the control unit 118 may cause actuation of different sets of rollers (1206-1212) based on considering ongoing singulation states and/or planned singulation actions and desired spacing amongst items (252-266) on the singulation conveyor 102.

Figure 13:
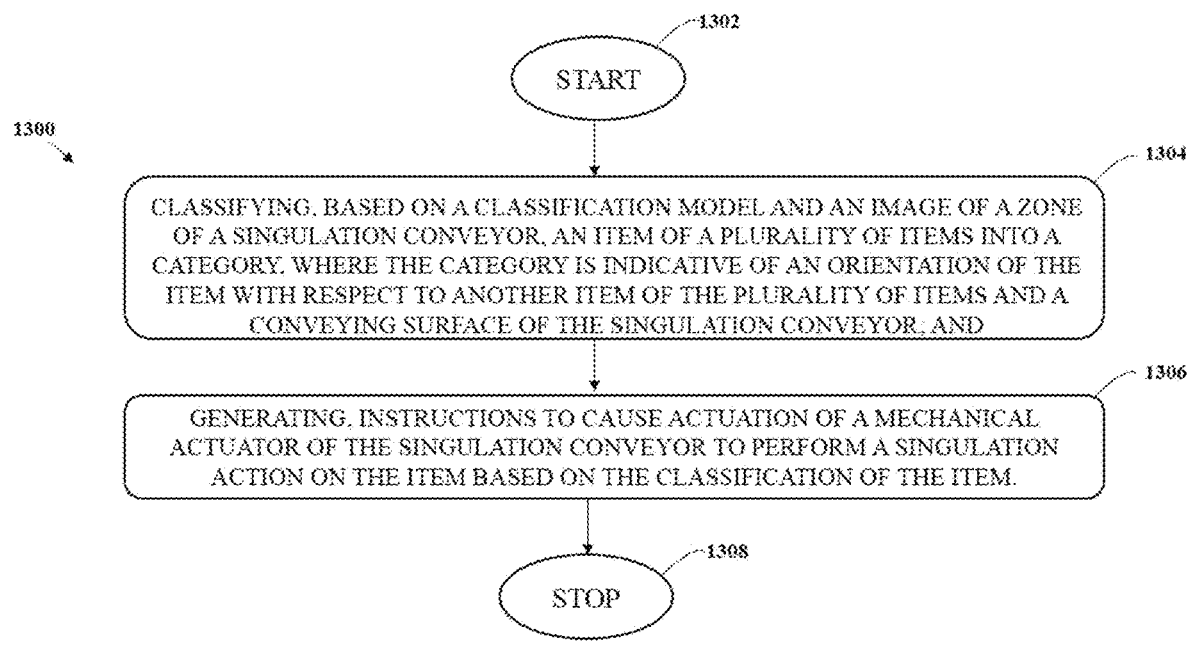
FIG. 13 illustrates an example flowchart representing a method for singulation of a plurality of items on the singulation conveyor, in accordance with some example embodiments described herein.
Figure 14:
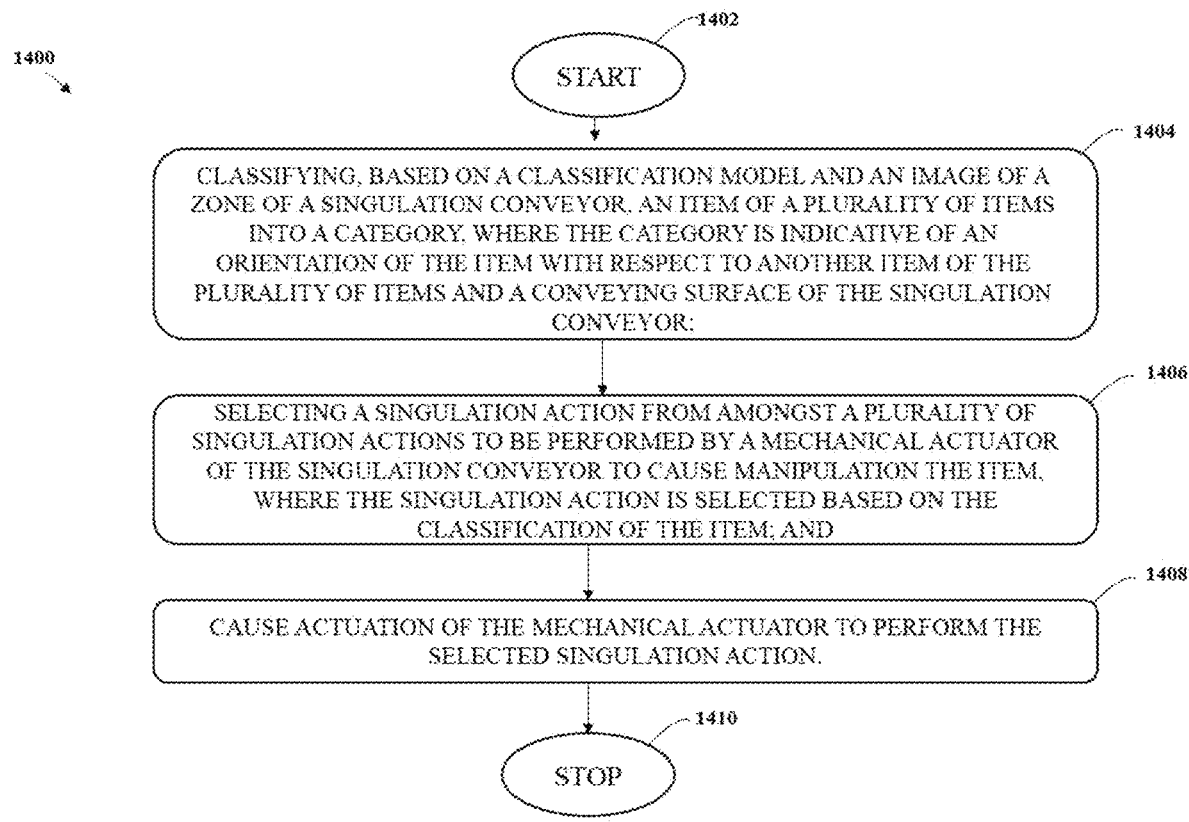
FIG. 14 illustrates an example flowchart representing another method for singulation of the plurality of items on the singulation conveyor, in accordance with some example embodiments described herein.
Figure 15:
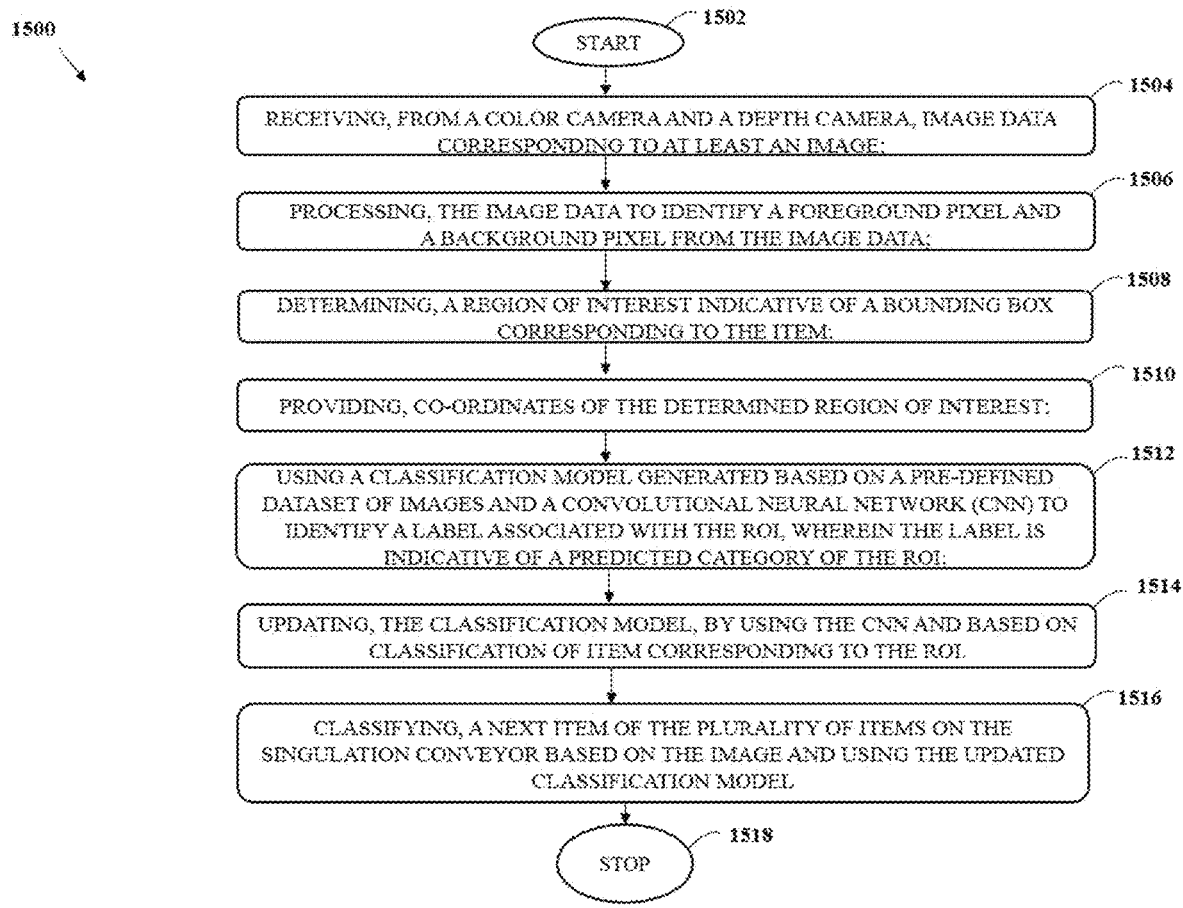
FIG. 15 illustrates an example flowchart representing a method for classification of an item from amongst a plurality of items on the singulation conveyor, in accordance with some example embodiments described herein.

FIGS. 13 through 15 illustrate, example flowcharts of the operations performed by an apparatus, such as the material handling system 100 of FIGS. 1-12 respectively, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 13 through 15, when executed, convert a computer or processing circuitry into a particular machine configured to perform an example embodiment of the present invention. Accordingly, the operations of FIGS. 13 through 15 defines an algorithm for configuring a computer or processor, to perform an example embodiment. In some cases, a general-purpose computer may be provided with an instance of the processor which performs the algorithm of FIGS. 13 through 15 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

FIG. 13 illustrates an example flowchart representing a method 1300 for singulation of a plurality of items (e.g. the stream of items 104) on the singulation conveyor 102, in accordance with some example embodiments described herein. The method starts at step 1302. At step 1304, the material handling system 100 may comprise means such as, the control unit 118, to classify an item of the plurality of items (e.g. items 234, 236, 238, 240, 242, 244, 246, 248 . . . 264) into a category indicative of an orientation (e.g., but not limited to, single, horizontal, vertical, stacked) of the item with respect to another item of the plurality of items and a conveying surface (e.g. surface of the conveyor bed 301) of the singulation conveyor 102. In this regard, the classification of the item into the category can be based on a classification model (e.g. the classification model generated by the AI subsystem 132) and an image of a zone (e.g. the zones) of the singulation conveyor 102 captured by the one or more sensors (202, 204, 206, and 208).

Moving to step 1304, the material handling system 100 may include means such as, the control unit 118, to generate instructions that can cause actuation of a mechanical actuator (e.g. the mechanical actuator 350 comprising the puck 352) of the singulation conveyor 102. In this regard, the control unit 118 may cause actuation of the mechanical actuator 352 based on the classification of the set of the items. In accordance with various example embodiments described herein, the actuation of the mechanical actuator 352 by the control unit 118, can cause the mechanical actuator 352 to perform a singulation action on the item. In this regard, the singulation action may be of any type (e.g. the first type 300, 400, the second type 500, the third type 600, the fourth type 700, and/or the like, as described in FIGS. 3-12). The singulation action may be based on the classification associated with the item. The method stops at step 1308.

FIG. 14 illustrates an example flowchart representing another method 1400 for singulation of the plurality of items on the singulation conveyor 102, in accordance with some example embodiments described herein. The method 1400 starts at step 1402. At step 1404, the material handling system 100 may include means such as, the control unit 118, to classify an item (e.g. from amongst the items 234, 236, 238, 240, 242, 244, 246, 248 . . . 264) into a category indicating an orientation of the item with respect to another item and a conveying surface of the singulation conveyor 102. In this regard, the control unit 118 may classify the item using a classification model and an image of the zone of the singulation conveyor 102 in a material handling environment.

Moving to step 1404, the control unit 118 may select a singulation action from amongst a plurality of singulation actions that can be performed by a mechanical actuator (e.g. the pucks 352 . . . 370) of the singulation conveyor 102. The singulation action may correspond to any of a spacing action as described in FIGS. 3 and 4, a horizontal split as described in FIG. 5, a vertical split as described in FIG. 6, a quick-stop as described in FIG. 7, and/or the like, that may cause manipulation of the item. In this regard, the control unit 118 may select the singulation action from amongst the plurality of singulation actions based on the classification (said differently, category) associated with the item. For example, the control unit 118, select the singulation action to be a horizontal split, if the item is categorized into a category indicating horizontal orientation of the item with respect to other items and the conveying surface of the singulation conveyor 102.

At step 1408, in accordance with said example embodiments, the control unit 118 may cause actuation of the mechanical actuator (i.e. one or more pucks 352 . . . 370) to perform the selected singulation action. For instance, for performing the horizontal split action, the control unit 118 may cause actuation of the set of pucks 502, as described in FIG. 5. Similarly, to cause the vertical split action, the control unit 118 may cause actuation of the set of pucks 602, as described in FIG. 6. The method 140 stops at 1410.

FIG. 15 illustrates an example flowchart 1500 representing a method for classification of an item from amongst a plurality of items on the singulation conveyor 102, in accordance with some example embodiments described herein. The method starts at step 1502. At step 1504, the method can comprise receiving from a color camera (e.g. the color cameras, 202-1, 204-2, 206-2, and 208-1) and a depth camera (e.g. the depth cameras, 202-2, 204-2, 206-2, and 208-2) of the sensing unit 134 (e.g. the sensors 202, 204, 206, and 208), image data corresponding to at least the image captured of a zone of the singulation conveyor 102. In this regard, color image data, i.e. image data of the images captured by the color camera may comprise pixel values (e.g. RGB values per pixel, and/or the like) and depth image data, i.e. image data of the images captured by the depth camera may comprise pixel values where each pixel can also include depth information (i.e. related to a distance between an image plane and corresponding object in an RGB image of the same image).

At step 1506, the control unit 118 may process the image data to identify foreground pixels and background pixels in the image of the zone of the singulation conveyor 102. In this regard, the control unit 118 may identify the foreground pixel and background pixel based on similar techniques as described in reference to FIG. 2.

At step 1508, the material handling system 100 may include means such as, the AI subsystem 132 to determine, a region of interest (e.g. the ROI's 210, 212, 214, 216, as described in FIG. 2) indicative of a bounding box corresponding to the item 234. In some examples, the AI subsystem 132 may determine a plurality of ROI's indicative of bounding boxes of each set of items (e.g. set 1 (items 236-246), set 2 (items 248-252), set 3 (items 254-264)) respectively, within the respective ROI's. In this regard, the AI subsystem 132 may determine the ROI's based on similar techniques, as described in reference to FIG. 2

At step 1510, the AI subsystem 132 can provide co-ordinates of the ROI (210, 212, 214, 216, as described in FIG. 2) determined at step 1508. In this aspect, the co-ordinates of ROI may correspond to co-ordinate values in three dimensions (e.g. x, y, and z co-ordinate system) of each of plurality of 3D points that may lie on periphery of the ROI. Said differently, co-ordinate values of each 3D point of the ROI corresponds to such 3D points which upon connecting defines a virtual periphery of the ROI.

At step 1512, the control unit 118 can use a classification model generated by the AI subsystem 132 based on a pre-defined dataset of images (as described in FIG. 2) and Neural Network (NN) to identify a label associated with the ROI. The label herein corresponds to a predicted category associated with the ROI. The predicted category referred herein, indicates a likely orientation (single, horizontal, vertical, stacked) of items or set of items within the ROI. In accordance with said example embodiments, the predicted category can be an output from the classification model generated by the AI subsystem 132 using the NN.

In accordance with said example embodiments, the AI subsystem 132 may use various machine learning/computer vision techniques to build the NN and generate the classification model. For instance, the AI subsystem 132 may access a large dataset of images e.g., but not limited to, images of a material handling environment having a similar set up of the singulation conveyor 102 on which items may be positioned in different orientations. Further, each image of the large data set of images can be associated with a label indicating orientation of an item or a set of items in the respective image.

In some examples, labelling of a set of images of the large dataset can be performed manually and validated by an operator working in the material handling environment. To this extent, the large dataset of images may comprises images of each category (i.e. single item, horizontally oriented items, vertically oriented items, stacked items, and/or the like). In some examples, the large dataset of images may include images captured in: different types of material handling environments and varying background and lighting conditions. In some examples, to generate the classification model, the large dataset of images can be segregated into three sets which can be used for: (a) training, (b) validation, and (c) testing of the classification model using the NN. For instance, a first set of the large dataset of images may be used by the AI subsystem 132 to train a classification model generated by the AI subsystem 132 using the NN. In this regard, each layer of the NN may identify various feature points, as described in FIG. 2 (e.g., but not limited to, edges, blobs, corners, rectangles, indicia, and/or the like) from the images of the large data set of the images. A classifier of the classification uses this information to predict an outcome on input set of images, i.e. the images captured at step 1504, in near real-time. Further, at an end of each pass through the first set of images (i.e. the training), a second set of the images can be used by the classifier to validate the prediction at training phase. Further, a third set of images can be used by the AI subsystem 132 to validate the classification predicted by the classification model at the training and validation phase. Accordingly, based on three phases described herein, the classification model can be generated by the AI subsystem 132 and used by the control unit 118 for classification of the item or set of items in the ROI.

At step 1514, the AI subsystem 132 can update the classification model used by the control unit 118 at step 1512. The AI subsystem 132 can update the classification model by using the NN and based on the classification of item corresponding to the ROI performed by the control unit 118 in near-real time. In this regard, in accordance with various example embodiments described herein, the AI subsystem 132 can update the classification model used for classifying items, after each classification step performed in near-real time or in operation of the singulation conveyor 102. In some examples, the AI subsystem 132 may update the classification model based on a validation of a predicted category of the item by the classification model. For instance, the AI subsystem 132 may compare results of a predicted category of the item before the classification and actual results of singulation achieved post classification of item in near-real time. Accordingly, the classification model may be, constantly or periodically, updated based on latest results achieved by the classification of item (i.e. a desired singulation result achieved on the singulation conveyor 102 due to correct classification of the item).

Further, at step 1516, the control unit 118 may classify a next item of the plurality of items on the singulation conveyor 102 based on the image and using the updated classification model. The method 1500 stops at step 1518.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A material handling system for singulation of items, the material handling system comprising:
   a singulation conveyor comprising a mechanical actuator configured to manipulate an item of a plurality of items on the singulation conveyor;
   a sensing unit comprising an imaging device configured to capture an image of a zone of the singulation conveyor; and
   a control unit communicatively coupled to the singulation conveyor and the sensing unit, the control unit configured to:
      classify, based on a classification model and the image, the item of the plurality of items into a category indicative of an orientation of the item with respect to another item of the plurality of items and a conveying surface of the singulation conveyor;
      cause updating of the classification model by using a Neural Network (NN) and based on the classification of the item;
      classify a next item of the plurality of items on the singulation conveyor based on the image and using the updated classification model; and
      generate instructions to cause actuation of a mechanical actuator to perform a singulation action based on the classification associated with the item.

2. The material handling system of claim 1, further comprising:

an Artificial Intelligence (AI) subsystem communicatively coupled to the control unit, wherein the AI subsystem is configured to:

receive, from at least one of a color camera and a depth camera, image data corresponding to at least the image captured by the at least one of the color camera and the depth camera;

process the image data to identify a foreground pixel and a background pixel from the image data;

identify, based on the processing of the image data, a region of interest indicative of a bounding box corresponding to the item; and provide co-ordinates of the region of interest and a label corresponding to the region of interest to the control unit.

3. The material handling system of claim 2, wherein the AI subsystem is further configured to:

generate the classification model by using a pre-defined dataset of images and the neural network; and identify, based on the classification model, a label indicative of a predicted category of the item.

4. The material handling system of claim 2, wherein the AI subsystem is configured to provide a list of regions of interests comprising at least one of:

a single region of interest indicative of a first region of interest comprising a single item;

a horizontal region of interest indicative of a second region of interest in which a first set of items are partially overlapping each other and meeting along a horizontal axis;

a vertical region of interest indicative of a third region of interest in which a second set of items are partially overlapping each other and meeting along a vertical axis; and a stacked region of interest indicative of a fourth region of interest in which a third set of items are substantially overlapping with each other.

5. The material handling system of claim 1, wherein the control unit is configured to:

select the singulation action based on the classification of the item; and generate instructions to cause actuation of the mechanical actuator to manipulate the item based on the selected singulation action.

6. The material handling system of claim 1, wherein the mechanical actuator comprises a puck configured to be pushed up or pulled down relative to a roller bed of the singulation conveyor to manipulate the item positioned on a conveying surface of the roller bed.

7. The material handling system of claim 1, wherein based on the classification of the item, the control unit is configured to generate instructions to cause actuation of the mechanical actuator to perform one or more of: (a) a de-shingling of the item from the plurality of items, (b) a horizontal splitting action to separate the item from the plurality of items, in a case wherein the item is partially overlapped on the plurality of items along a horizontal axis, (c) a vertical splitting action to separate the item from the plurality of items, in a case wherein the item is partially overlapped on the plurality of items along a vertical axis, (d) a quick stop action to stop movement of remaining items of the plurality of items, in a case wherein there is not enough space for the item to perform an action, and (e) a linear dispersion action to create a desired spacing between the item and the plurality of items.

8. The material handling system of claim 1, wherein the control unit is further configured to cause selective actuation of a set of pucks to create a difference in relative speed of conveyance between two items from amongst the plurality of items on the singulation conveyor, wherein the selective actuation of the set of pucks comprises at least one of raising or lowering of the set of pucks relative to the conveying surface of the singulation conveyor.

9. A method for singulation of a plurality of items on a singulation conveyor in a material handling system, the method comprising:

classifying, based on a classification model and an image of a zone of the singulation conveyor, an item of the plurality of items into a category, wherein the category is indicative of an orientation of the item with respect to another item of the plurality of items and a conveying surface of the singulation conveyor;

updating the classification model by using a Neural Network (NN) and based on the classification of the item;

classifying a next item of the plurality of items on the singulation conveyor based on the image and using the updated classification model; and generating instructions to cause actuation of a mechanical actuator of the singulation conveyor to perform a singulation action on the item based on the classification of the item.

10. The method of claim 9 further comprising:

receiving, from at least one of a color camera and a depth camera, image data corresponding to at least the image;

processing the image data to identify a foreground pixel and a background pixel from the image data;

determining a region of interest indicative of a bounding box corresponding to the item; and providing co-ordinates of the region of interest and a label corresponding to the region of interest to a control unit.

11. The method of claim 10, further comprising:

generating the classification model by using a pre-defined dataset of images and the neural network; and identifying a label indicative of a predicted category of at least one of the item or the region of interest associated with the item, wherein the label is identified based on the classification model.

12. The method of claim 9 comprising:

selecting the singulation action based on the classification of the item; and selecting the mechanical actuator from amongst a plurality of mechanical actuators on the singulation conveyor to manipulate the item based on the selected singulation action.

13. The method of claim 12 comprising:

generating, by a control unit, instructions to cause actuation of a puck of the mechanical actuator configured to be pushed up or pulled down relative to a roller bed of the singulation conveyor to manipulate the item positioned on a conveying surface of the roller bed.

14. The method of claim 9 further comprising providing a list of regions of interests comprising at least one of:

a single region of interest indicative of a first region of interest comprising a single item;

a horizontal region of interest indicative of a second region of interest in which a first set of items are partially overlapping each other and meeting along a horizontal axis;

a vertical region of interest indicative of a third region of interest in which a second set of items are partially overlapping each other and meeting along a vertical axis; and a stacked region of interest indicative of a fourth region of interest in which a third set of items are substantially overlapping with each other.

15. The method of claim 9 further comprising selectively actuating a set of pucks to at least raise or lower the set of pucks to create a difference in relative speed of conveyance between two items from amongst the plurality of items on the singulation conveyor.

16. An apparatus for singulation of a plurality of items in a material handling environment, the apparatus comprising at least one processor and at least one non-transitory memory including program code, the at least one non-transitory memory and the program code configured to, with the at least one processor, cause the apparatus to at least:
classify, using a classification model and an image of a zone of a singulation conveyor in the material handling environment, an item of the plurality of items into a category indicative of an orientation of the item with respect to another item of the plurality of items and a conveying surface of the singulation conveyor;
update the classification model by using a Neural Network (NN) and based on the classification of the item;
classify a next item of the plurality of items on the singulation conveyor based on the image and using the updated classification model;
select a singulation action from amongst a plurality of singulation actions to be performed by a mechanical actuator of the singulation conveyor to cause manipulation the item, wherein the singulation action is selected based on the classification of the set of items; and
cause actuation of the mechanical actuator to perform the selected singulation action.

17. The apparatus of claim 16, wherein the at least one non-transitory memory and the program code are further configured to, with the at least one processor, further cause the apparatus to at least:
process image data received from at least one of a color camera and a depth camera, and based on the image data, identify a foreground pixel and a background pixel;
identify, based on processing of the image data, a region of interest indicative of a bounding box corresponding to the item; and
determine, using a pre-defined neural network, a label associated with the region of interest, wherein the label is indicative of a predicted category of at least one of the item or the region of interest associated with the item.

18. The apparatus of claim 17, wherein the at least one non-transitory memory and the program code are further configured to, with the at least one processor, further cause the apparatus to at least:
cause actuation of a puck of the mechanical actuator, wherein the puck is configured to be pushed up or pulled down relative to a roller bed of the singulation conveyor to manipulate the item positioned on a conveying surface of the roller bed.

19. The apparatus of claim 16, wherein the at least one non-transitory memory and the program code are further configured to, with the at least one processor, further cause the apparatus to at least:
select the singulation action based on the classification of the item; and
select the mechanical actuator from amongst a plurality of mechanical actuators on the singulation conveyor, to manipulate the item based on the selected singulation action.

20. The apparatus of claim 16, wherein the at least one non-transitory memory and the program code are further configured to, with the at least one processor, further cause the apparatus to at least:
selectively actuate a set of pucks to at least raise or lower the set of pucks to create a difference in relative speed of conveyance between two items from amongst the plurality of items on the singulation conveyor.

* * * * *